US008881265B2

(12) United States Patent
Ishikawa et al.

(10) Patent No.: US 8,881,265 B2
(45) Date of Patent: Nov. 4, 2014

(54) COMPUTER SYSTEM, COMPUTER SYSTEM CONTROL METHOD, COMPUTER SYSTEM CONTROL PROGRAM, AND INTEGRATED CIRCUIT

(75) Inventors: Hiroo Ishikawa, Osaka (JP); Masahiko Saito, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 83 days.

(21) Appl. No.: 13/876,963

(22) PCT Filed: Jul. 20, 2012

(86) PCT No.: PCT/JP2012/004625
§ 371 (c)(1),
(2), (4) Date: Mar. 29, 2013

(87) PCT Pub. No.: WO2013/035235
PCT Pub. Date: Mar. 14, 2013

(65) Prior Publication Data
US 2013/0191617 A1   Jul. 25, 2013

(30) Foreign Application Priority Data

Sep. 8, 2011   (JP) .................................. 2011-195822

(51) Int. Cl.
*G06F 9/30*   (2006.01)
*G06F 12/14*   (2006.01)
*G06F 9/48*   (2006.01)

(52) U.S. Cl.
CPC ........ *G06F 9/3004* (2013.01); *G06F 2209/483* (2013.01); *G06F 12/14* (2013.01); *G06F 9/4881* (2013.01)
USPC ............................................. 726/17; 712/216

(58) Field of Classification Search
CPC . G06F 12/14; G06F 9/3004; G06F 2209/483; G06F 9/4881
USPC ............................................. 712/216; 726/17
See application file for complete search history.

(56) References Cited

U.S. PATENT DOCUMENTS

| 5,303,369 | A | 4/1994 | Borcherding et al. |
| 5,781,775 | A | 7/1998 | Ueno |
| 6,675,191 | B1 | 1/2004 | Ito |
| 7,415,725 | B2 * | 8/2008 | Henneberry et al. ........... 726/17 |

(Continued)

FOREIGN PATENT DOCUMENTS

| JP | 6-119300 | 4/1994 |
| JP | 9-128351 | 5/1997 |

(Continued)

OTHER PUBLICATIONS

International Search Report issued Sep. 18, 2012 in International (PCT) Application No. PCT/JP2012/004625.

*Primary Examiner* — Haresh N Patel
(74) *Attorney, Agent, or Firm* — Wenderoth, Lind & Ponack, L.L.P.

(57) ABSTRACT

A computer system includes a memory having a secure area and a plurality of processors using the memory. When an access-allowed program unit executed by one of the processors starts an access to the secure area, the program unit subject to execution by the other processors is limited to the access-allowed program unit.

8 Claims, 28 Drawing Sheets

(56) References Cited

U.S. PATENT DOCUMENTS

| | | | |
|---|---|---|---|
| 8,001,592 B2* | 8/2011 | Hatakeyama | 726/17 |
| 8,255,988 B2* | 8/2012 | Carpenter | 726/17 |
| 8,561,169 B2* | 10/2013 | Harris et al. | 726/17 |
| 2004/0268354 A1 | 12/2004 | Kanai et al. | |
| 2006/0294519 A1 | 12/2006 | Hattori et al. | |
| 2008/0178261 A1 | 7/2008 | Yao et al. | |
| 2008/0184361 A1* | 7/2008 | Thekkath | 726/17 |
| 2008/0282342 A1* | 11/2008 | Hatakeyama | 726/17 |
| 2009/0254986 A1* | 10/2009 | Harris et al. | 726/17 |
| 2012/0240220 A1* | 9/2012 | Smith | 726/17 |

FOREIGN PATENT DOCUMENTS

| | | |
|---|---|---|
| JP | 2000-330807 | 11/2000 |
| JP | 2001-249821 | 9/2001 |
| JP | 2002-278778 | 9/2002 |
| JP | 2005-18590 | 1/2005 |
| JP | 2007-4661 | 1/2007 |
| JP | 2008-176637 | 7/2008 |
| JP | 2008-250386 | 10/2008 |

* cited by examiner

FIG. 2

Control register group 131

| Register number | Start address | End address | Access permission |
|---|---|---|---|
| 1 | 0x8400_0000 | 0x8402_FFFF | 1 |
| 2 | 0x0000_0000 | 0x0000_0000 | 0 |
| ⋮ | ⋮ | ⋮ | ⋮ |
| N | 0x0000_0000 | 0x0000_0000 | 0 |

FIG. 4

Secure area management table 400

| OS ID (410) | Start address (420) | End address (430) | Access permission (440) |
|---|---|---|---|
| 1 | 0x8400_0000 | 0x8402_FFFF | 1 |

FIG. 5

OS ID management table 500

| OS ID (510) | Priority (520) | Access flag (530) |
|---|---|---|
| 1 | 10 | 1 |
| 2 | 20 | 0 |

Variant OS ID management table 1300

| OS ID | Priority |
|---|---|
| 1 | 10 |
| 2 | 20 |

FIG. 23

Variant secure area management table 2300

| PG ID | Start address | End address | Access permission |
|---|---|---|---|
| 1 | 0x8400_0000 | 0x8402_FFFF | 1 |
| 2 | 0x9E00_0000 | 0x9E00_FFFF | 1 |
| 9 | 0x8400_0000 | 0x8402_FFFF | 2 |

FIG. 24

PG ID management table 2400

| PG ID | Priority | PID | | | | | Access flag |
|---|---|---|---|---|---|---|---|
| 1 | 10 | 100 | 140 | 141 | 207 | ... | 0 |
| 2 | 20 | 144 | 145 | 201 | – | ... | 1 |
| 9 | 7 | 72 | 36 | – | – | ... | 0 |
| ⋮ | ⋮ | ⋮ | ⋮ | ⋮ | ⋮ | ⋮ | ⋮ |

COMPUTER SYSTEM, COMPUTER SYSTEM CONTROL METHOD, COMPUTER SYSTEM CONTROL PROGRAM, AND INTEGRATED CIRCUIT

TECHNICAL FIELD

The present disclosure pertains to a computer system having a plurality of processors.

BACKGROUND ART

From a security standpoint, confidential information handled by a computer system is beneficially protected to ensure that the confidential information is not accessed (i.e., read or written to) only by specific trusted programs (hereinafter, secure programs) and not by any program that is not trusted (hereinafter, non-secure programs).

For this purpose, the computer system has a specific area of memory for storing the confidential information (hereinafter, secure area) and an access controller that allows access to the secure area only when a predetermined condition for allowing access is met. Thus, the access controller limits access so that access is allowed only while the secure program is being executed.

Technology for controlling a program execution period is known, such as conventional technology in which a computer system includes a plurality of processors (hereinafter, a parallel computer system) and performs parallel execution of a plurality of program units (e.g., Cited Publication 1).

CITATION LIST

Patent Literature

[Patent Literature 1]
Japanese Patent Application Publication No. H09-128351

SUMMARY OF INVENTION

Technical Problem

However, the aforementioned Cited Publication 1 controls the program execution period for the secure program such that access is allowed by the access controller only during the controlled period. Improvements in processor efficiency are sought while maintaining security.

In consideration of the above-described problem, the present disclosure aims to provide a computer system that increases the probability of improvements to processor efficiency, at least until access to the secure area by a program unit made up of the secure program begins.

Solution to Problem

In order to solve the above problems, one aspect of the present invention provides a computer system including a memory having a secure area, and a first processor and a second processor using the memory, the computer system comprising, as functional components realized by at least one of the first processor and the second processor executing a program stored in the memory: an execution controller managing execution control of a plurality of program units executed by the first processor and the second processor; and a start notification receiver receiving an access start notification from one or more access-allowed program units being one or more of the program units for which access to the secure area is allowed, the access start notification indicating that an access to the secure area by the first processor is starting, wherein when the access start notification is received by the start notification receiver, the execution controller manages limited execution control such that the second processor is limited to executing one of the access-allowed program units.

Advantageous Effects of Invention

According to the computer system of the present disclosure configured as described above, the execution controller performs execution control of a plurality of program units during a period lasting until the start of an access to the secure area by an access-allowed program unit, for which access to the secure area is allowed. Thus, during this period, one of the processors is able to execute a program from another program unit, despite the processor losing an executed program from among one of the program units. Accordingly, the computer system increases the probability of improvements to processor efficiency over a conventional computer system performing scheduling for each processor via gang scheduling. This is achieved in a computer system in which a program unit that includes a non-secure program is not subject to execution while an access to the secure area is being performed by the program unit made up of secure programs, at least for the period lasting until the start of the access to the secure area by the program unit made up of secure programs.

BRIEF DESCRIPTION OF DRAWINGS

FIG. 2 is a data configuration diagram of a control register group 131.
FIG. 4 is a data configuration diagram of a secure area management table 400.
FIG. 5 is a data configuration diagram of an OS ID management table 500.
FIG. 23 is a data configuration diagram of a variant secure area management table 2300.
FIG. 24 is a data configuration diagram of a PG ID management table 2400.

DESCRIPTION OF EMBODIMENTS (Process Leading to Embodiment of the Disclosure)

The inventors researched the details of technology such as that of Cited Publication 1, described above, in which the period of execution for a secure program is controlled and an access controller allows access to the secure area only during the period of execution.

In such a parallel computer system, despite the inclusion of the access controller therein, and the access controller allowing the access during the execution period of the secure program by one of the processors, there is a risk that the confidential information may be accessed by a non-secure program if the non-secure program is executed by another one of the processors.

As such, a conventional parallel computer system also exists where, at any given time, all processors are executing a program unit of programs that are all secure, or are all non-secure. Thus, the processors are scheduled by synchronising and performing gang scheduling such that during each predetermined interval (hereinafter termed a quantum), the program unit subject to execution is switched. This approach prevents a secure program and a non-secure program from being executed simultaneously.

Figure 30:
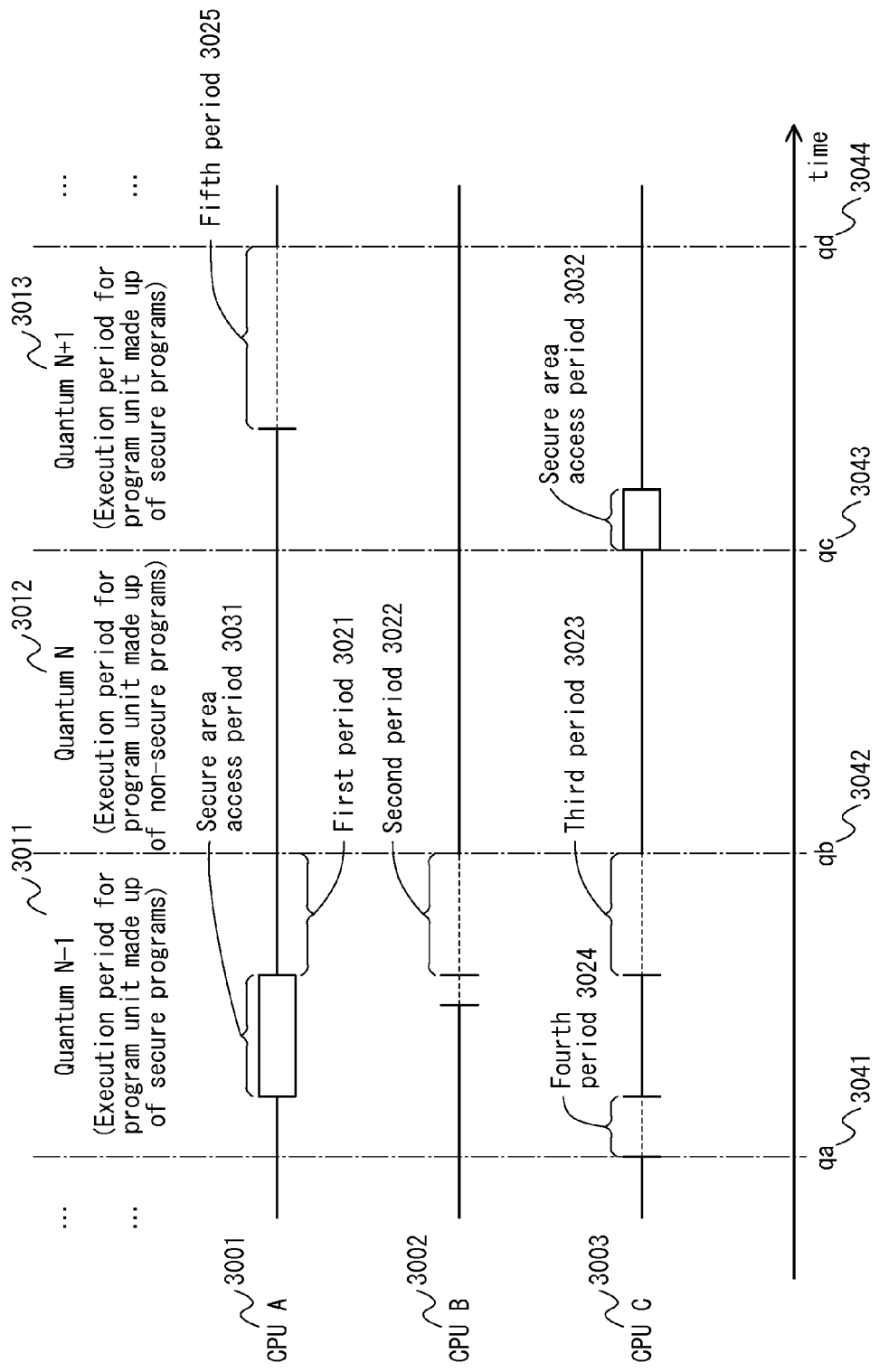
FIG. 30 is a processor timing chart pertaining to a conventional computer system.

FIG. 30 is a processor timing chart for a conventional parallel computer system that includes three processors, namely CPU A 3001, CPU B 3002, and CPU C 3003, and in which the processors are scheduled using gang scheduling.

As shown, CPU A 3001, CPU B 3002, and CPU C 3003 are synchronised, and the program unit subject to execution is switched each of time qa 3041, qb 3042, qc 3043, and qd 3044.

In this example, during quantum N−1 3011, the processors execute a first program unit made up of secure programs, during quantum N, the processors execute a second program unit that includes non-secure programs, and during quantum N+1, the processors once again execute the first program unit.

As shown in FIG. 30, secure area access period 3031 and secure area access period 3032 respectively represent periods during which access to the secure area is performed by the secure program, and the dashed lines indicate an idle state for the corresponding processor.

Accordingly, in the conventional parallel computer system scheduling the processors by performing gang scheduling, execution of a non-secure program is prevented during a period (e.g., secure area access period 3031 and secure area access period 3032 in FIG. 30) in which access to the secure area is performed by the secure program.

Generally speaking, a computer system with improved processor efficiency is desirable. The inventors noticed the following problems pertaining to processor efficiency in the above-described conventional technology. Specifically, the computer system performing processor scheduling using gang scheduling is problematic in that, in a given quantum, a processor that is left without a program to execute in the program unit subject to execution is unable to execute a program from a program unit subject to execution during a different quantum. This, in turn, causes a problem that a subset of the processors are in an idle state during at least part of the quantum in which a program unit is subject to execution.

Upon consideration of the above, the inventors arrived at the discovery that a computer system can be provided that enables a higher probability of improvements to processor efficiency over a conventional computer system performing scheduling for each processor via gang scheduling by having a program unit that includes a non-secure program not be subject to execution while the program unit made up of the secure programs is performing the access to the secure area.

Embodiment 1

(Outline)

The following describes a computer system including a memory having a secure area storing confidential information, four processors using the memory, and an access controller controlling access to the secure area by the processors, as an Embodiment of a computer system pertaining to the present disclosure.

The computer system is executed by a hypervisor performing execution control for a plurality of operating systems. Thus, each of the plurality of operating systems is executed independently.

The operating systems subject to execution include an operating system performing execution control that is limited to a secure program (hereinafter termed a secure operating system).

Within the computer system, the hypervisor performs execution control of the operating systems such that the only operating system subject to execution is the secure operating system, as long as the secure program is accessing the secure area. Then, the hypervisor controls the access controller so as to allow access to the secure area by the processors while the secure program is accessing the secure area.

The following describes the configuration of a computer system pertaining to Embodiment 1 with reference to the accompanying drawings.

(Configuration)

Figure 1:
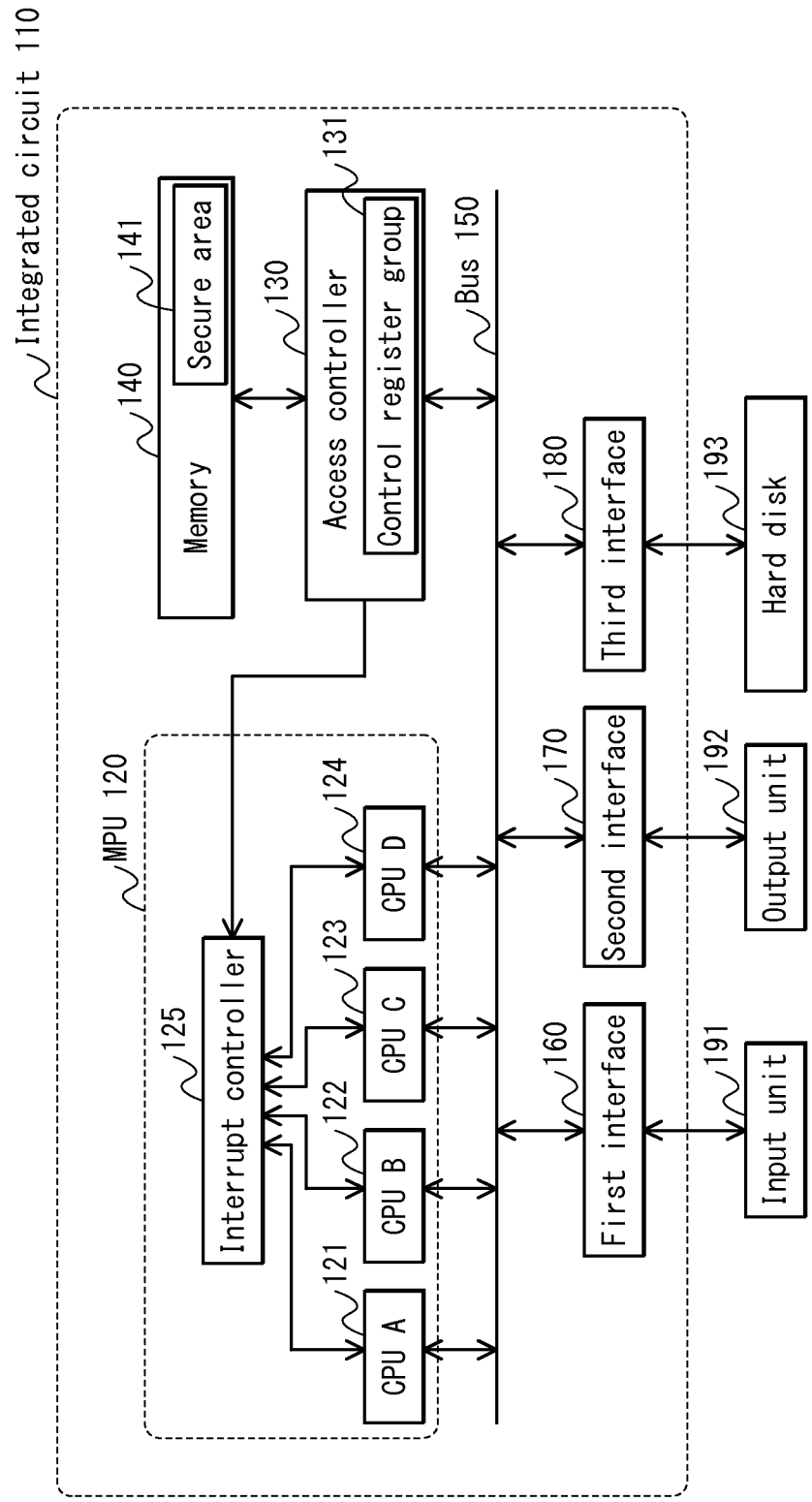
FIG. 1 is a block diagram indicating the principal hardware configuration of a computer system 100.

FIG. 1 is a block diagram indicating the principal hardware configuration of a computer system 100.

As shown, the hardware of the computer system 100 is a computer device that includes an integrated circuit 110, an input unit 191, an output unit 192, and a hard disk 193.

The integrated circuit 110 includes a Multi Processor Unit (hereinafter, MPU) 120, an access controller 130, a memory 140, a bus 150, a first interface 160, a second interface 170, and a third interface 180. MPU 120, in turn, includes Central Processing Unit (hereinafter, CPU) A 121, CPU B 122, CPU C 123, CPU D 124, and an interrupt controller 125.

The memory 140 includes both Read-Only Memory (hereinafter, ROM) and Random Access Memory (hereinafter, RAM), is connected to the access controller 130, and stores a program defining the operations of the CPUs A 121 through D 124 as well as data used by the CPUs A 121 through D 124. One area of the memory 140 is defined as a secure area 141 for storing confidential data.

The confidential data are, for instance, encryption keys for decrypting content, personal information such as addresses, and so on.

The access controller 130 is connected to the memory 140, the bus 150, and the interrupt controller 125, and includes a control register group 131 having the following three functions.

Access Forbidding Function: A function of forbidding access by the CPUs A 121 through D 124 to the secure area 141 when a predetermined value is not set in the control register group 131.

Here, to forbid access is to prevent access from occurring.

Access Restricting Function: A function of allowing access by the CPUs A 121 through D 124 to a portion of the secure area 141 when the predetermined value is set in the control register group 131, the portion being defined by the set value, and of forbidding access by the CPUs A 121 through D 124 to all portions of the secure area other than the portion defined by the set value.

Here, to allow access is to perform access.

FIG. 2 is a data configuration diagram indicating a sample data configuration of the control register group 131.

As shown, the control register group 131 is configured as a collection of N registers (e.g., N=16), each including a register number 210, a start address 220, an end address 230, and an access permission 240.

The register number 210 is a field for storing an ID number identifying a corresponding register. The register number 210 is defined in advance for each register, and cannot be overwritten.

The start address 220 and the end address 230 are fields for respectively storing the start address and the end address of a consecutive memory portion of the secure area.

The access permission 240 is a field for storing access information indicating an access permit to the consecutive memory portion designated by the start address 220 and the end address 230.

Here, the access information field has a logic value of one to indicate that both reading and writing are allowed, has a logic value of two to indicate that only reading is allowed, has a logic value of three to indicate that only writing is allowed, and has a logic value of zero to indicate that neither reading nor writing is allowed.

The start address 220, the end address 230, and the access permission 240 are each initialised by having a logic value of zero written thereto. The CPUs A 121 through D 124 are then able to write values thereto via the bus 150.

The explanation of the functions of the access controller 130 resumes, with reference to FIG. 1.

Exception Interrupt Notification Function: A function of the access controller 130 transmitting a memory access exception interrupt request signal to the interrupt controller 125 indicating that access to the memory 140 is forbidden, whenever access to the memory 140 is forbidden to one of the CPUs A 121 through D 124.

Here, the memory access exception interrupt request signal includes information specifying the CPU that attempted to access the memory while forbidden from doing so.

The interrupt controller 125 is connected to the access controller 130, to CPU A 121, to CPU B 122, to CPU C 123, and to CPU D 124, receives an interrupt request signal from each connected device, and interrupts the relevant CPU with appropriate timing according to the interrupt request signal received.

The bus 150 is connected to the access controller 130, to CPU A 121, to CPU B 122, to CPU C 123, to CPU D 124, to the first interface 160, to the second interface 170, and to the third interface 180, and relays signals between each of the connected devices.

The input unit 191 includes a keyboard, a mouse, or the like, is connected to the first interface 160, is controlled by the CPUs A 121 through D 124 executing the program, and receives an operation command made by the user with the keyboard, the mouse, or the like.

The output unit 192 includes a display, a speaker, or the like, is connected to the second interface 170, is controlled by the CPUs A 121 through D 124 executing the program, and outputs text, images, audio, and so on using the display, the speakers, or the like.

The first interface 160, the second interface 170, and the third interface 180 are each connected to the bus 150, and respectively enable an exchange of signals between the bus 150 and the input unit 191, between the bus 150 and the output unit 192, and between the bus 150 and the hard disk 193.

CPU A 121, CPU B 122, CPU C 123, and CPU D 124 are processors each having similar functions. As such, the following describes CPU A 121 as a representative CPU.

CPU A 121 is connected to the interrupt controller 125 and the bus 150, and executes a program stored in the memory 140, jointly with the other CPUs, to control the access controller 130, the memory 140, the input unit 191, the output unit 192, and the hard disk 193, and causes the computer system 100 to function as a computer.

By executing the program stored in the memory 140, CPU A 121 controls the computer system 100 and causes the computer system 100 to execute characteristic operations, including the functions of executing an access start process, a rescheduling process, a secure area setting process, an access end process, and an access control process. The aforementioned processes are described in detail later, with reference to corresponding flowcharts.

CPU A 121 has a user mode, a first privilege mode, and a second privilege mode that outranks the first privilege mode.

Figure 3:
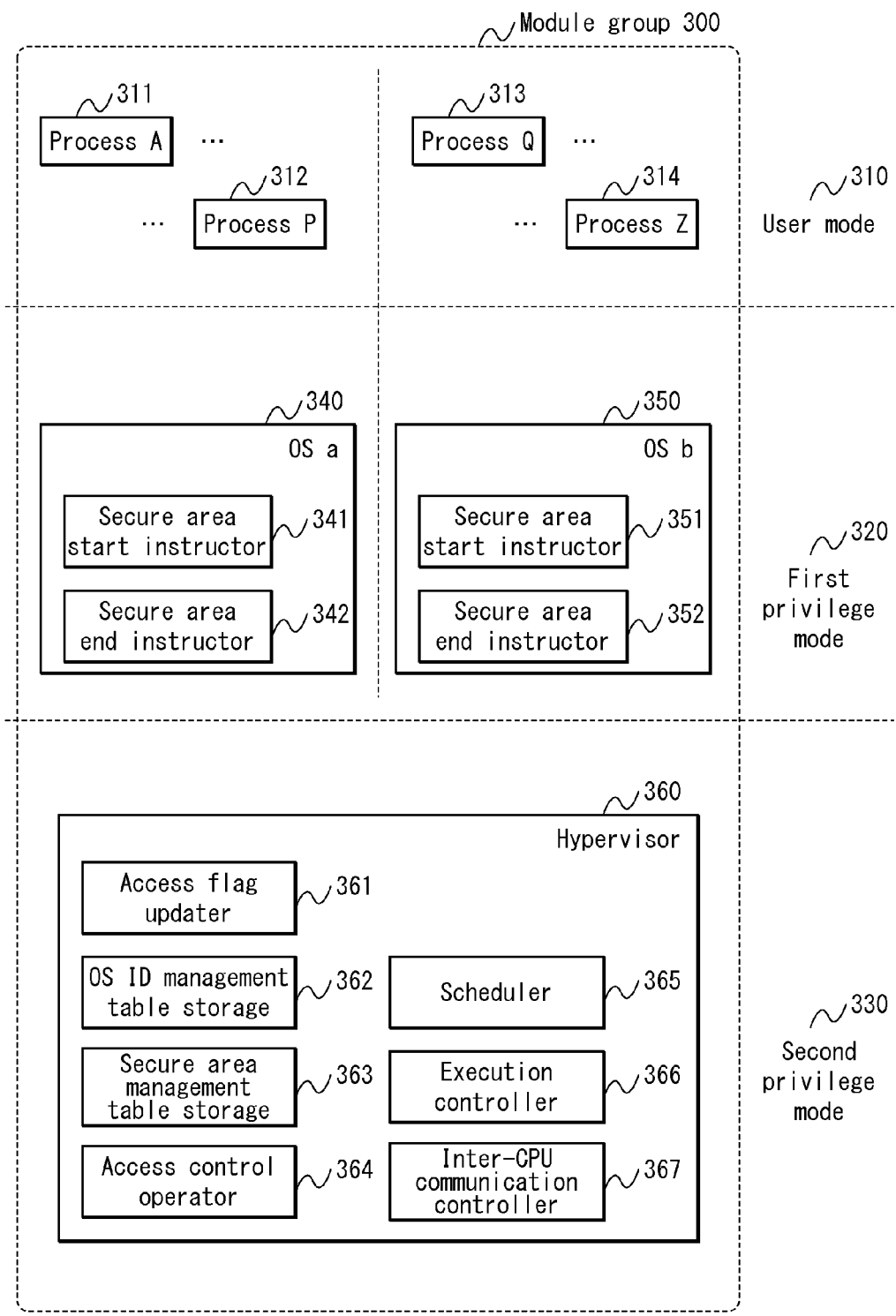
FIG. 3 is a schematic diagram of a module group 300.

FIG. 3 is a schematic diagram indicating a program module (hereinafter simply module) group 300 subject to execution on the CPUs A 121 through D 124.

As indicated, the module group 300 subject to execution on the CPUs A 121 through D 124 includes processes A 311 through P 312 and processes Q 313 through Z 314 executed in the user mode 310, operating systems a 301 and b 350 executed in the first privilege mode 320, and the hypervisor 360 executed in the second privilege mode 330.

The hypervisor 360 is a hypervisor module performing execution control of OS a 340 and OS b 350, and includes an access flag updater 361, an OS ID management table storage 362, a secure area management table storage 363, an access control operator 364, a scheduler 365, and an inter-CPU communication controller 367.

OS a 340 is an operating system module performing execution control of process A 311 through process P 312, and includes secure area start instructor 341 and secure area end instructor 342. OS a 340 causes a system made up of OS a 340 itself and the processes executed thereby to function as a virtual machine.

OS b 350 is an operating system module performing execution control of process Q 313 through process Z 314, and includes secure area start instructor 351 and secure area end instructor 352. OS b 350 causes a system made up of OS b 350 itself and the processes executed thereby to function as a virtual machine.

Each process A 311 through process P 312 is a task generated by one of the CPUs A 121 through D 124 executing a specific trusted application (hereinafter termed a secure application). Also, process A 311 through process P 312 have been verified in advance as not using the data stored in the secure area 141 inappropriately.

Examples of secure applications include a content decrypter program decrypting content by using an encryption key, a mailer program using registered addresses, and so on.

The following describes process A 311 through process P 312 as secure programs.

Each process Q 313 through process Z 314 is a task generated by one of the CPUs A 121 through D 124 executing an application other than the specific trusted application (hereinafter termed non-secure application). Also, processes Q 313 through Z 314 have not been verified in advance as not using the data stored in the secure area 141 inappropriately. The following describes processes Q 313 through Z 314 as non-secure programs.

The secure area start instructor 341 detects the start of an access to the secure area 141 performed by a process controlled by the OS that includes the secure area start instructor 341 (i.e., OS a 340), and transmits an access start signal indicating that the access to the secure area 141 has started to the access flag updater 361. Here, the access start signal includes the OS ID identifying the OS transmitting the signal.

The secure area end instructor 342 detects the end of the access to the secure area 141 performed by the process controlled by the OS that includes the secure area end instructor 342 (i.e., OS a 340) and transmits an access end signal indicating that the access to the secure area 141 has ended to the access flag updater 361. Here, the access end signal includes the OS ID identifying the OS transmitting the signal.

Secure area start instructor 351 and secure area end instructor 352 are similar to secure area start instructor 341 and secure area end instructor 342, respectively. Accordingly, the explanation thereof is omitted.

The secure area management table storage 363 stores a secure area management table 400.

FIG. 4 is a data configuration diagram indicating a sample data configuration of the secure area management table 400.

As shown, the secure area management table 400 indicates the associations between an OS ID 410, a start address 420, an end address 430, and an access permission 440.

The OS ID 410 is an identifier identifying an OS, and either has a logic value of one when the identified OS is OS a 340 or has a logic value of two when the identified OS is OS b 350.

The start address 420 and the end address 430 are fields for respectively storing the start address and the end address of a consecutive memory portion of the secure area.

The access permission 440 is access information indicating an access permit from an OS identified by the corresponding OS ID 410 to the consecutive memory portion designated by the start address 420 and the end address 430.

This access information is similar to the access information of access permission 240. Accordingly, the explanation thereof is omitted.

Here, the secure area management table 400 is a table determined in advance, during system development, the contents of which are not updatable.

In the example shown in FIG. 4, the secure area management table 400 lists the secure area 141 as being made up of the consecutive logical addresses between the start address of 0x8400_0000 and the end address of 0x8402_FFFF. Also, OS a 340 is indicated as being allowed to both read and write to this area.

The explanation of the module group 300 resumes with reference to FIG. 3.

The OS ID management table storage 362 stores an OS ID management table 500.

FIG. 5 is a data configuration diagram indicating a sample data configuration of the OS ID management table 500.

As shown, the OS ID management table 500 indicates the associations between an OS ID 520, a priority 520, and an access flag 530.

The OS ID 510 is an identifier identifying an OS, and either has a logic value of one when the identified OS is OS a 340 or has a logic value of two when the identified OS is OS b 350.

The priority 520 is an execution priority of the OS identified by the corresponding OS ID 510 when the hypervisor 360 performs execution control of the OS.

Here, the priority 520 takes an integer value between 0 and 99, inclusive. The larger the value, the higher the priority. The execution control of the OS by the hypervisor 360 using the priority 520 is described later, as part of the explanation of the scheduler 365.

The access flag 530 is a flag indicating whether or not the OS identified by the OS ID 510 is accessing the secure area 141.

Here, the access flag 530 is set to a logic value of one to indicate that the secure area 141 is being accessed, and is set to a logic value of zero to indicate that the secure area 141 is not being accessed.

The explanation of the module group 300 resumes with reference to FIG. 3.

The access flag updater 361 has the following three functions.

Access Flag One-Update Function: When an access start signal has been received by secure area start instructor 341 or by secure area start instructor 351, and the sender OS sending the access start signal is an OS identified by the OS ID 410 of the secure area management table 400 stored in the secure area management table storage 363, updating the access flag 530 associated with the OS ID 510 identifying the sender OS within the OS ID management table 500 stored in the OS ID management table storage 362 with a logic value of one.

Access Flag Zero-Update Function: When an access end signal has been received by secure area end instructor 342 or by secure area end instructor 352, and the sender OS sending the access end signal is an OS identified by the OS ID 410 of the secure area management table 400 stored in the secure area management table storage 363, updating the access flag 530 associated with the OS ID 510 identifying the sender OS within the OS ID management table 500 stored in the OS ID management table storage 362 with a logic value of zero.

Rescheduling Request Function: When the access flag 530 of the OS ID management table 500 stored in the OS ID management table storage 362 has been updated, making a rescheduling request to the scheduler 365 according to the updated OS ID management table 500.

The scheduler 365 has the following two functions.

Standard Scheduling Function: When all logic values for the access flag 530 in the OS ID management table 500 stored in the OS ID management table storage 362 read zero, performing scheduling for each OS of each CPU such that the execution time ratio for each OS executed by the CPUs corresponds to the priority 520 for each OS.

Limited Scheduling Function: When an access flag 530 in the OS ID management table 500 stored in the OS ID management table storage 362 has a logic value of one, performing scheduling for each OS of each CPU such that, for all CPUs, the OS being executed is limited to the OS identified by the OS ID 510 corresponding to the access flag 530 having the logic value of one.

An execution controller 366 performs execution control of the OS for all CPUs in accordance with the execution schedule scheduled by the scheduler 365.

The execution controller 366 temporarily stops the execution of every OS while the scheduler 365 is performing the scheduling.

The inter-CPU communication controller 367 generates an appropriate interrupt request signal when one of the CPUs requires an interruption notification to another one of the CPUs and sends the signal to the interrupt controller 125, and receives an interruption when the interrupt controller 125 has performed the interruption.

The access control operator 364 has the following two functions.

Secure Area Setting Function: When the logic value of the access flag 530 in the OS ID management table 500 stored in the OS ID management table storage 362 has been updated to read one, and an identifier identical to the OS ID 510 corresponding to the access flag 530 belongs to the OS ID 410 in the secure area management table 400 stored in the secure area management table storage 363, reading the start address 420, the end address 430, and the access permission 440 corresponding to the OS ID 410 and writing the start address 220, the end address 230, and the access permission 240 to a register in the control register group 131 to which only an initial value is written.

Secure Area Release Function: When the logic value of the access flag 530 in the OS ID management table 500 stored in the OS ID management table storage 362 has been updated to read zero, and an identifier identical to the OS ID 510 corresponding to the access flag 530 belongs to the OS ID 410 in the secure area management table 400 stored in the secure area management table storage 363, rewriting the register in the control register group 131 to which the start address 420, the end address 430, and the access permission 440 corresponding to the OS ID 410 are written with an initial value, the initial value being a logic value of zero.

The operations of the computer system 100, described above, are explained below with reference to the accompanying drawings.

(Operations)

The following describes characteristic operations of the computer system 100, namely an access start process, a rescheduling process, a secure area setting process, an access end process, and an access control process.

(Access Start Process)

The access start process mainly involves the hypervisor 360, and is a process of, upon receiving a notification from OS a 340 or OS b 350 indicating that access to the secure area 141 has started, rescheduling the OS being executed, and setting the control register group 131 in accordance with the notification.

Figure 6:
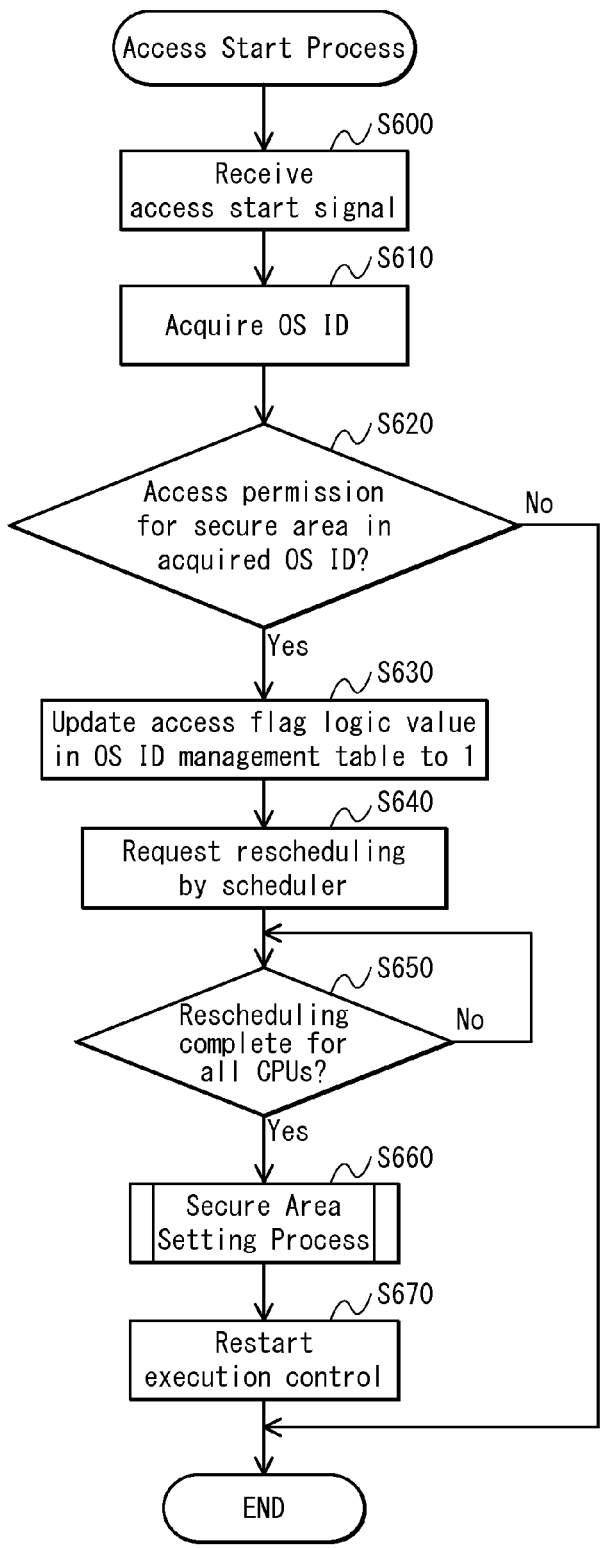
FIG. 6 is a flowchart of an access start process.

FIG. 6 is a flowchart of the access start process.

The access start process begins with secure area start instructor 341 of OS a 340 or secure area start instructor 351 of OS b 350 detecting that a process controlled by the OS that includes the secure area start instructor has started an access to the secure area 141, and sending an access start signal to the access flag updater 361.

Once the access start process has begun, the access flag updater 361 receives the access start signal (step S600).

Upon receiving the access start signal, the access flag updater 361 acquires the OS ID in the received access start signal (step S610). The access flag updater 361 then investigates whether or not an identifier identical to the acquired OS ID is in the OS ID 410 field of the secure area management table 400 stored in the secure area management table storage 363, and thus investigates whether or not the OS identified by the acquired OS ID has an access permission to the consecutive memory area in the secure area 141 (step S620).

When the access permission is found in step S620 (Yes in step S620), i.e., when an identifier identical to the acquired OS ID is included in the OS ID 410 field of the secure area management table 400 stored in the secure area management table storage 363, the access flag updater 361 updates the access flag 530 associated with the OS ID 510 of the identifier identical to the acquired OS ID in the OS ID management table 500 stored in the OS ID management table storage 362 to have a logic value of one (step S630). Then, the access flag updater 361 makes a rescheduling request to the scheduler 365 (step S640).

Upon receiving the rescheduling request, the scheduler 365 performs the later-described rescheduling process, thus rescheduling each OS for each CPU such that the OS executed by each of the CPUs is restricted to the OS identified by the OS ID 510 corresponding to the access flag 530 having the logic value of one.

The execution controller 366 temporarily stops the execution of the OS for every CPU while the scheduler 365 is performing the scheduling.

The access control operator 364 stands by until the scheduler 365 completes scheduling for all CPUs (repeated No in step S650). Afterward (Yes in step S650), the later-described secure area setting process is performed, such that the start address 420, the end address 430, and the access permission 440 corresponding to the OS ID acquired by the access flag updater 361 are written to a register among the control register group 131 to which the initial value is written (step S660).

Once writing to the register of the control register group 131 is finished, the access control operator 364 makes a notification to the execution controller 366 indicating that the writing to the register is complete. The execution controller 366 then resumes execution control of the OS for all CPUs (step S670).

When the access permission is not found in step S620 (No in step S620), i.e., when an identifier identical to the acquired OS ID is not included in the OS ID 410 field of the secure area management table 400 stored in the secure area management table storage 363, or when step S670 is complete, the hypervisor 360 ends the access start process.

(Rescheduling Process)

The rescheduling process is performed by the scheduler 365, and is a process of referencing the OS ID management table 500 stored in the OS ID management table storage 362 to schedule each OS for each CPU when rescheduling has been requested.

Figure 7:
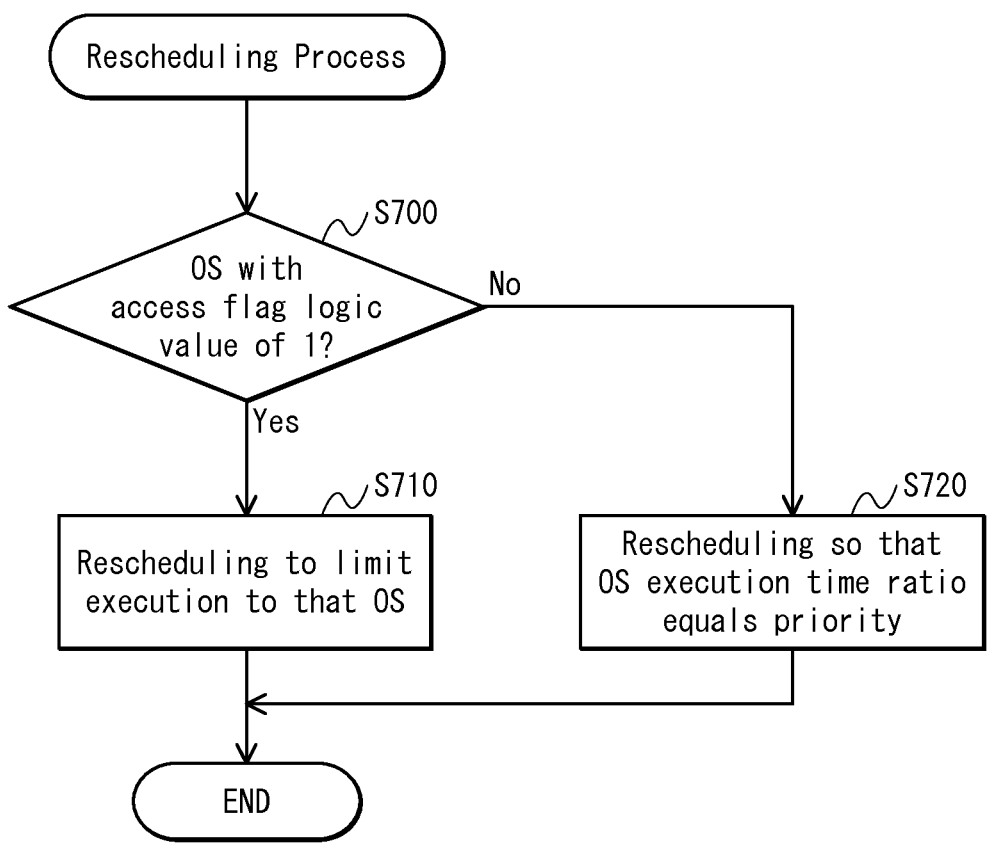
FIG. 7 is a flowchart of a rescheduling process.

FIG. 7 is a flowchart of the rescheduling process.

The rescheduling process begins with the rescheduling request from the access flag updater 361.

Once the rescheduling process begins, the scheduler 365 checks whether or not an access flag 530 having a logic value of one is present in the OS ID management table 500 stored in the OS ID management table storage 362 (step S700).

When an access flag 530 having a logic value of one is found in step S700 (Yes in step S700), the scheduler 365 reschedules each OS for each CPU such that all CPUs execute only the OS identified by the OS ID 510 corresponding to the access flag 530 (step S710).

When an access flag 530 having a logic value of one is not found in step S700 (No in step S700), the scheduler 365 reschedules each OS for each CPU such that the execution time ratio for each OS executed by the CPUs corresponds to the priority 520 ratio for each OS.

When step S710 or step S720 is completed, the scheduler 365 ends the rescheduling process.

(Secure Area Setting Process)

The secure area setting process is performed by the access control operator 364, and is a process of updating a register in the control register group 131 when the access flag 530 in the OS ID management table 500 stored in the OS ID management table storage 362 has been updated.

Figure 8:
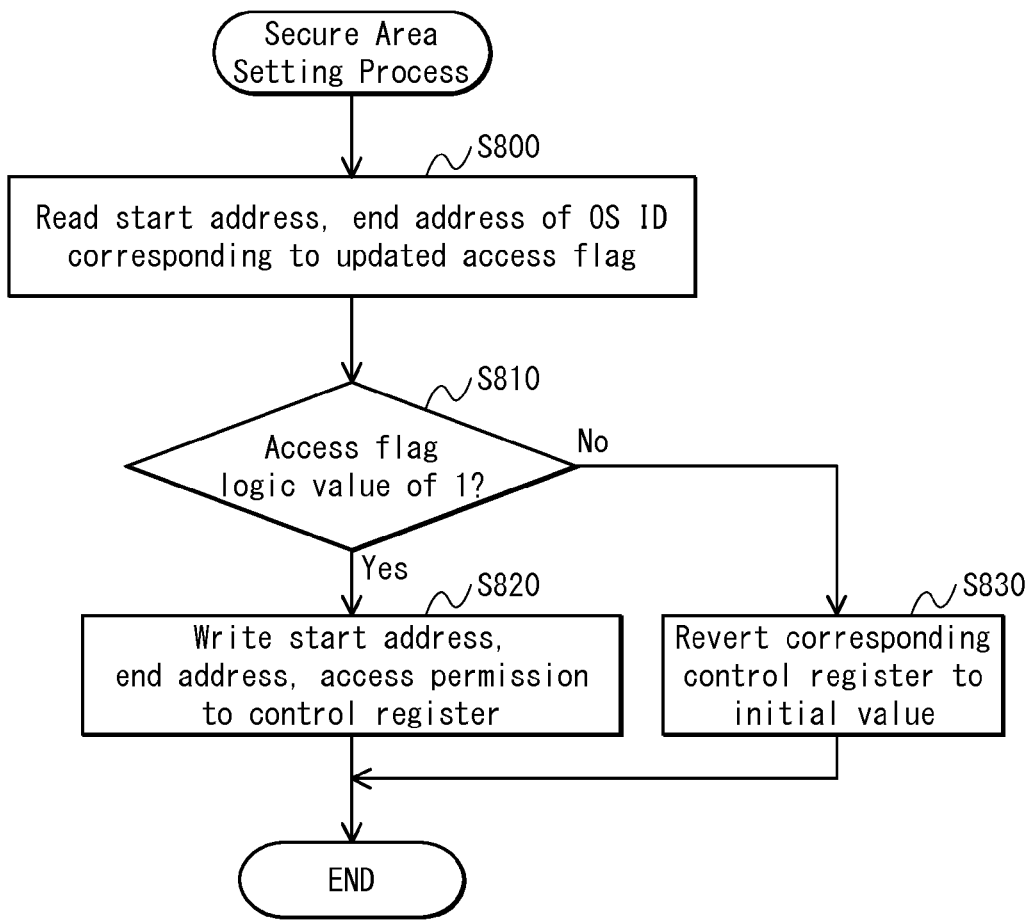
FIG. 8 is a flowchart of a secure area setting process.

FIG. 8 is a flowchart of the secure area setting process.

The secure area setting process begins with an update to the access flag 530 of the OS ID management table 500 stored in the OS ID management table storage 362.

Once the secure area setting process begins, the access control operator 364 references the secure area management table 400 stored in the secure area management table storage 363 and reads the start address 420, the end address 430, and the access permission 440 corresponding to the OS ID 410 field with the identifier identical to the OS ID 510 corresponding to the updated access flag 530 (step S800). The access control operator 364 then investigates whether or not the updated access flag 530 has a logic value of one (step S810).

When a logic value of one is found in step S810 (Yes in step S810), the access control operator 364 writes the start address 220, the end address 230, and the access permission 240 to a register of the control register group 131 to which the initial value is written (step S820).

When a logic value of zero is found in step S810 (No in step S810), the access control operator 364 rewrites the register of the control register group 131 to which the values of the start address 420, the end address 430, and the access permission 440 corresponding to the OS ID 410 field with the identifier identical to the OS ID 510 corresponding to the updated access flag 530 are written with a logic value of zero, which is the initial value (step S830).

When step S820 or step S830 is complete, the access control operator 364 completes the secure area setting process.

(Access End Process)

The access end process mainly involves the hypervisor 360, and is a process of, upon receiving a notification from OS a 340 or from OS b 350 indicating that the access to the secure area 141 has ended, rescheduling the OS being executed and setting the control register group 131 in accordance with the notification.

Figure 9:
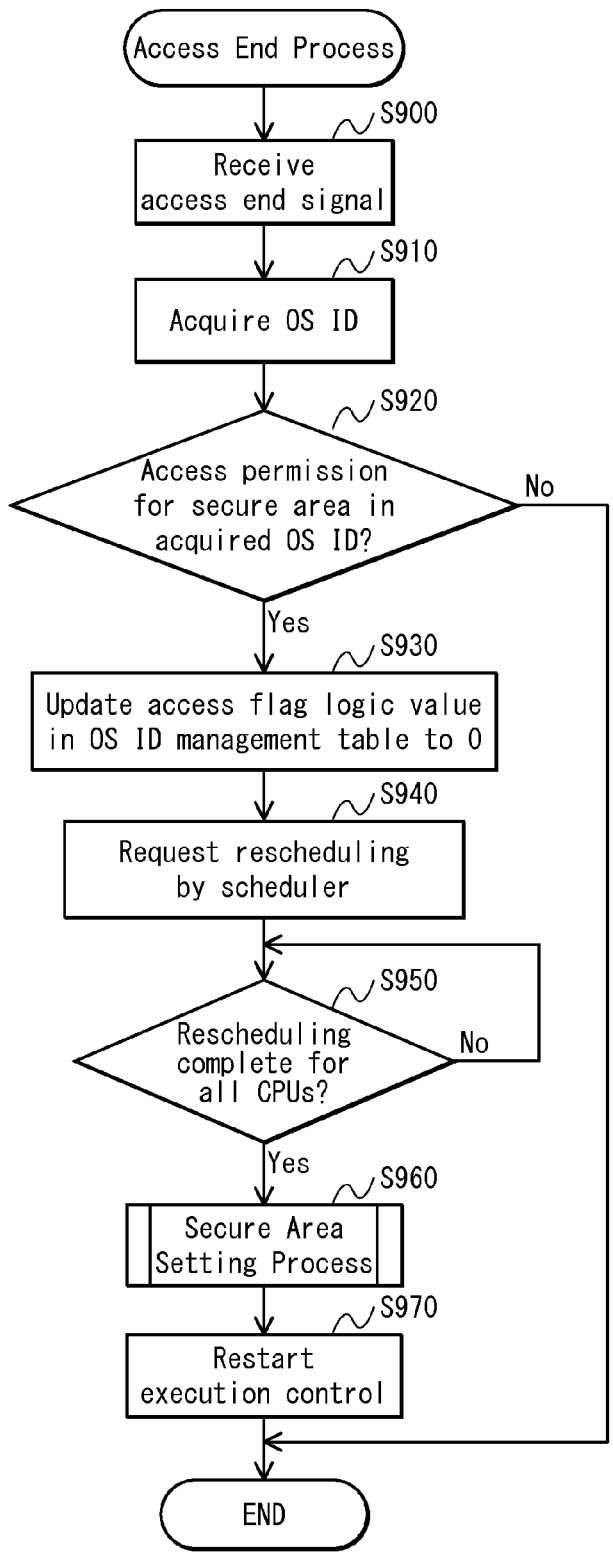
FIG. 9 is a flowchart of an access end process.

FIG. 9 is a flowchart of the access end process.

The access end process begins with secure area end instructor 341 of OS a 340 or secure area end instructor 351 of OS b 350 detecting that a process controlled by the OS that includes the secure area end instructor has ended an access to the secure area 141, and sending an access end signal to the access flag updater 361.

Once the access end process has begun, the access flag updater 361 receives the access end signal (step S900).

Upon receiving the access end signal, the access flag updater 361 acquires the OS ID in the received access end signal (step S910). The access flag updater 361 then investigates whether or not an identifier identical to the acquired OS ID is in the OS ID 410 field of the secure area management table 400 stored in the secure area management table storage 363, and thus investigates whether or not the OS identified by the acquired OS ID has an access permission to the consecutive memory area in the secure area 141 (step S920).

When the access permission is found in step S920 (Yes in step S920), i.e., when an identifier identical to the acquired OS ID is included in the OS ID 410 field of the secure area management table 400 stored in the secure area management table storage 363, the access flag updater 361 updates the access flag 530 associated with the OS ID 510 of the identifier identical to the acquired OS ID in the OS ID management table 500 stored in the OS ID management table storage 362 to have a logic value of zero (step S930). Then, the access flag updater 361 makes a rescheduling request to the scheduler 365 (step S940).

Upon receiving the rescheduling request, the scheduler 365 performs the above-described rescheduling process, thus rescheduling each OS for each CPU such that the execution time ratio for each OS executed by the CPUs corresponds to the priority 520 ratio for each OS.

The execution controller 366 temporarily stops the execution of the OS for every CPU while the scheduler 365 is performing the scheduling.

The access control operator 364 stands by until the scheduler 365 completes scheduling for all CPUs (repeated No in step S950). Afterward (Yes in step S950), the previously-described secure area setting process is performed, such that the register of the control register group 131 to which the values of the start address 420, the end address 430, and the access permission 440 corresponding to the OS ID 410 field with the identifier identical to the OS ID 510 corresponding to the updated access flag 530 are written is overwritten with a logic value of zero, which is the initial value (step S960).

When step S960 is complete, the access control operator 364 notifies the execution controller 366 that the register writing is complete. The execution controller 366 then resumes execution control of the OS for all CPUs (step S970).

When the access permission is not found in step S920 (No in step S920), i.e., when an identifier identical to the acquired OS ID is not included in the OS ID 410 field of the secure area management table 400 stored in the secure area management table storage 363, or when step S970 is complete, the hypervisor 360 ends the access end process.

(Access Control Process)

The access control process is performed by the access controller 130 and involves forbidding access when one of the CPUs A 121 through D 124 makes a request for access to the memory 140 and a predetermined conditioned is satisfied.

Figure 10:
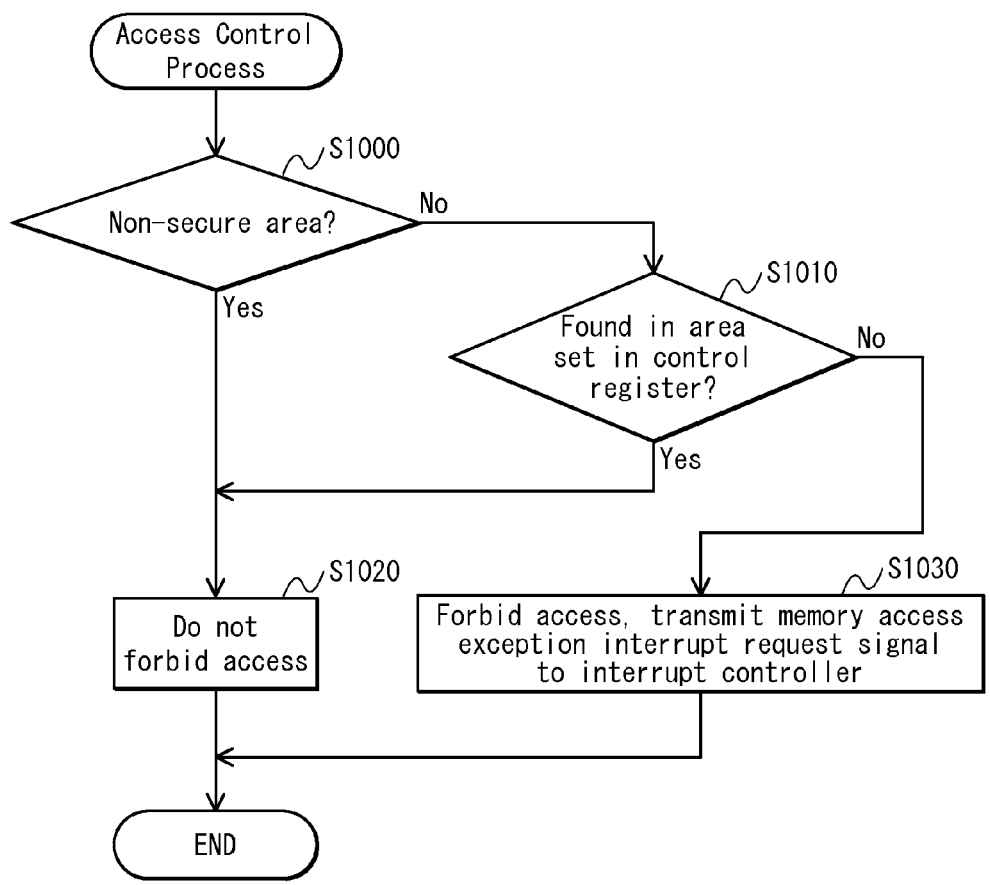
FIG. 10 is a flowchart of an access control process.

FIG. 10 is a flowchart of the access control process.

The access control process begins when one of the CPUs A 121 through D 124 makes a request for access to the memory 140.

Once the access control process begins, the access controller 130 investigates whether or not the request for access to the memory 140 is a request for access to an area other than the secure area 141 (hereinafter, non-secure area) (step S1000).

When the access request is found, in step S1000, to not be for the non-secure area (No in step S1000), the access controller 130 investigates whether or not the target area of the access includes the area indicated by the start address 220 and the end address 230 in the register of the control register group 131 (step S1010).

In the affirmative case (Yes in step S1010), and when the access is found, in step S1000, to be to the non-secure area (Yes in step S1000), the access controller 130 forbids the access (step S1020).

In the negative case (No in step S1010), the access controller 130 forbids the access and transmits a memory access exception interrupt request signal to the interrupt controller 125 (step S1030).

When S1020 or step S1030 ends, the access controller 130 completes the access control process.

(Discussion)

Figure 11:
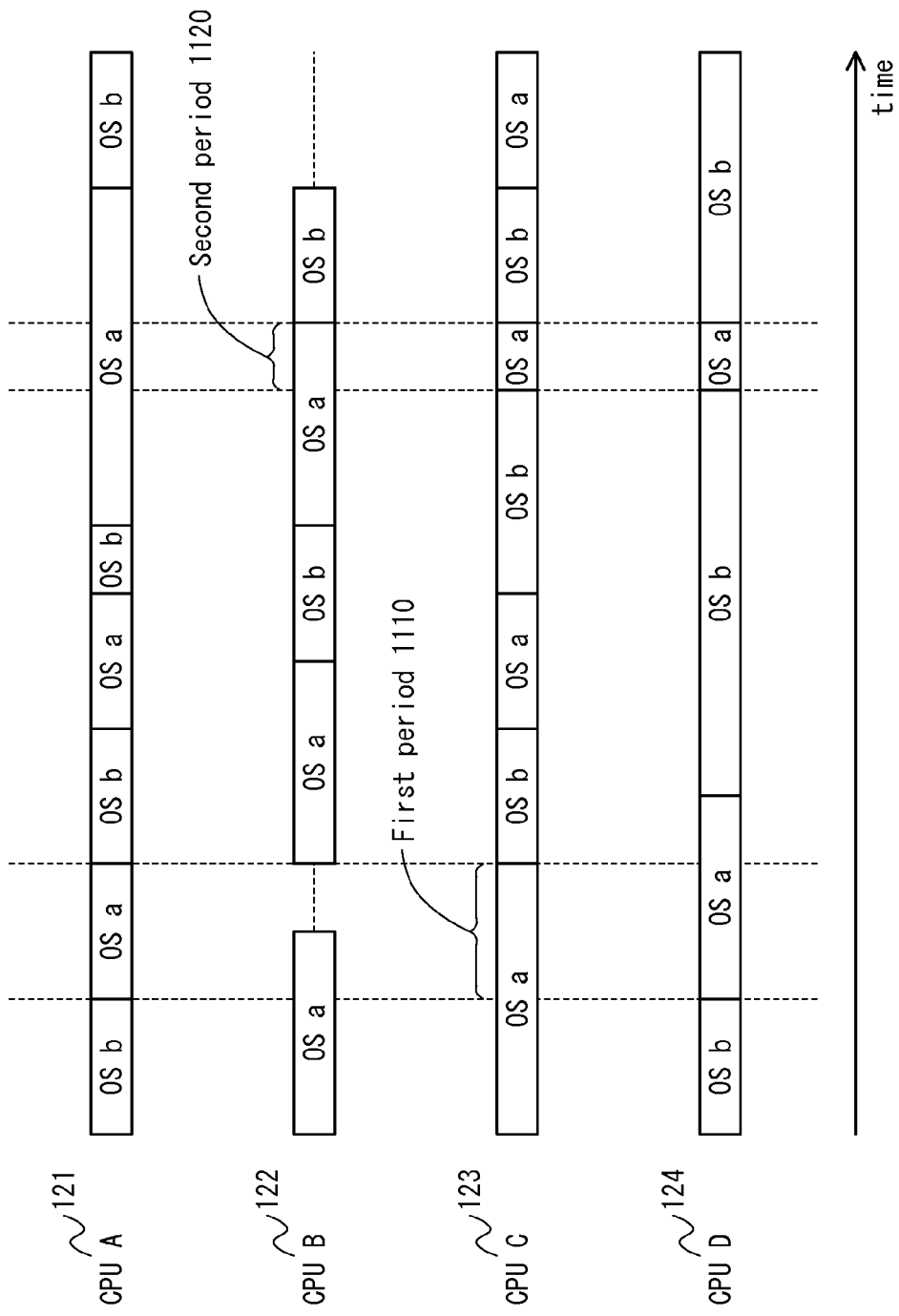
FIG. 11 is a CPU timing chart.

FIG. 11 is an example of a timing chart for the CPUs of the above-described computer system 100.

As shown, each rectangle inscribed with OS a indicates that the corresponding CPU executes OS a 340, each rectangle inscribed with OS b indicates that the corresponding CPU executes OS b 340, and the dashed lines indicate that the corresponding CPU is idle.

A first period 1110 indicates a secure process executed by CPU C 123 performing access to the secure area 141, and a second period 1120 similarly indicates a secure process executed by CPU B 122 performing access to the secure are 141.

As indicated in FIG. 11, the computer system 100 has no CPU executing OS b 350 during a period where the secure process executed by any of the CPUs is accessing the secure area 141 (e.g., the first period 1110 and the second period 1120; hereinafter termed secure area access periods). Accordingly, no non-secure access process is executed during the secure area access period.

Also, as indicated in FIG. 11, either of OS a 340 and OS b 350 is executable during any period that is not a secure area access period. Thus, during a period that is not a secure area access period, both secure processes and non-secure process are executable.

Embodiment 2

(Outline)

The following describes a first variant computer system, which differs in part from the computer system 100 of Embodiment 1, as an Embodiment of the computer system pertaining to the present disclosure.

The first variant computer system is similar to the computer system 100 of Embodiment 1 in terms of hardware configuration, but stores somewhat different programs in the memory 140 thereof.

The computer system 100 pertaining to Embodiment 1 is configured such that the access flag 530 (see FIG. 5) has a logic value of one while a secure program is accessing the secure area 141. In contrast, the first variant computer system pertaining to Embodiment 2 is configured such that the OS execution priority of the hypervisor is set to a predetermined value (a maximum value) while the secure process is performing the access to the secure area 141.

The following describes the first variant computer system pertaining to Embodiment 2 with reference to the drawings, and centring on the points of difference from the computer system 100 pertaining to Embodiment 1.

(Configuration)

The hardware configuration of the first variant computer system is identical to that of the computer system 100 pertaining to Embodiment 1. Accordingly, the description thereof is omitted.

In contrast, a subset of the programs stored in the memory 140 differ from those of the computer system 100 pertaining to Embodiment 1. Accordingly, a portion of the module group subject to operation by the CPUs A 121 through D 124 differs from the computer system 100 of Embodiment 1.

Figure 12:
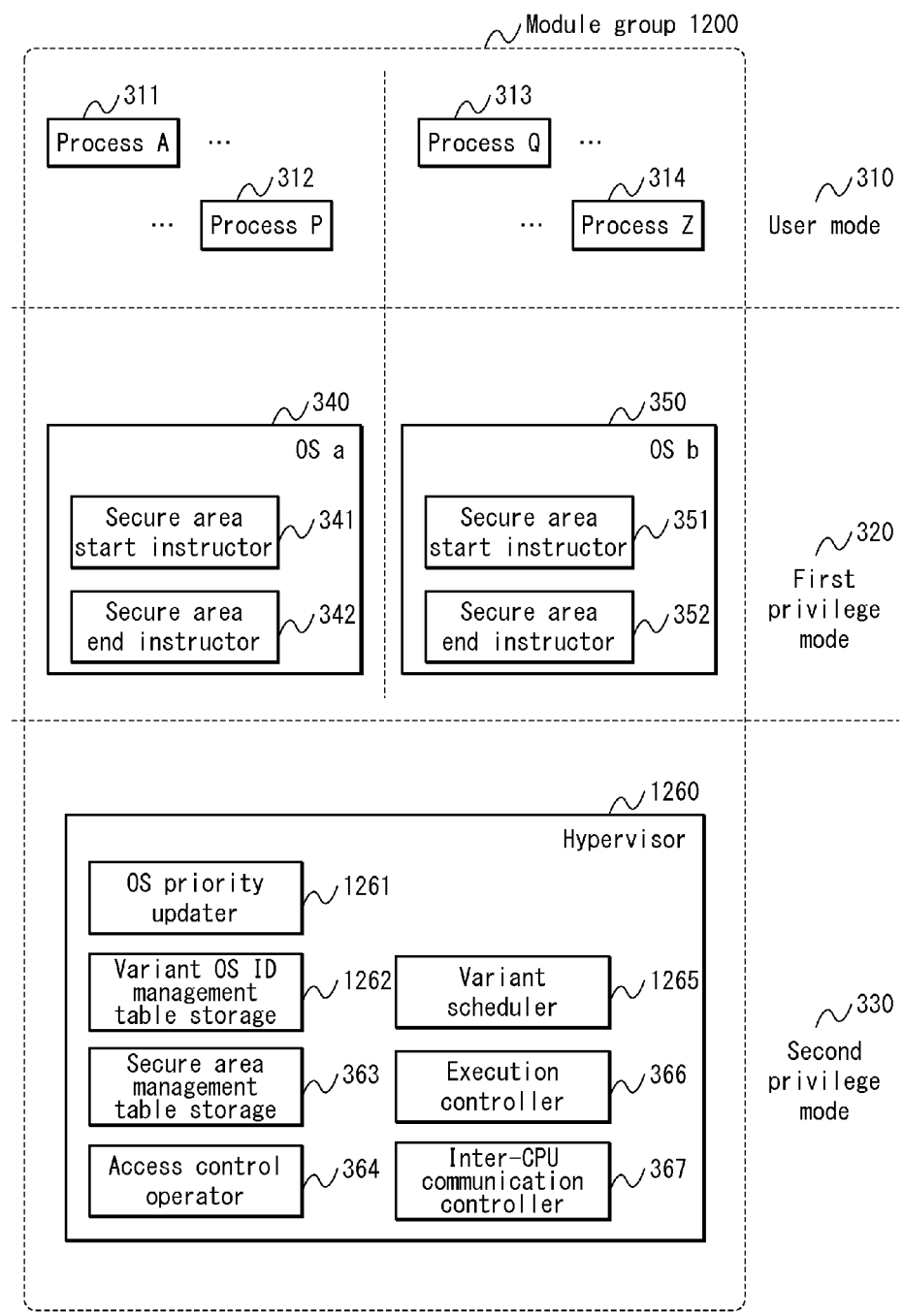
FIG. 12 is a schematic diagram of a module group 1200.

FIG. 12 is a schematic diagram representing the module group 1200 subject to execution on the CPUs A 121 through D 124. in the first variant computer system.

As shown, the module group 1200 differs from the module group 300 of Embodiment 1 in that the access flag updater 361 is replaced with an OS priority updater 1261, the OS ID management table storage 362 is replaced with a variant OS ID management table storage 1262, the scheduler 365 is replaced with a variant scheduler 1265, and the access control operator 364 is replaced with a variant access control operator 1264. According to these modifications, hypervisor 360 is replaced with hypervisor 1260.

The variant OS ID management table storage 1262 stores a variant OS ID management table 1300.

Figure 13:
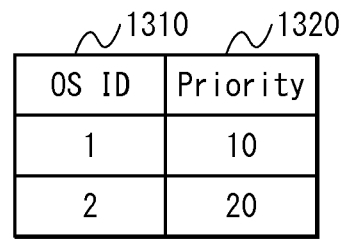
FIG. 13 is a data configuration diagram of a variant OS ID management table 1300.

FIG. 13 is a data configuration diagram indicating a sample data configuration of the variant OS ID management table 1300.

As shown, the variant OS ID management table 1300 indicates the associations between an OS ID 1320 and a priority 1320.

The OS ID 1310 is similar to the OS ID 510, and is an identifier for identifying an OS.

The priority 1320 is an execution priority of the OS identified by the corresponding OS ID 1310 when the hypervisor 360 performs execution control of the OS.

Here, the priority 1320 takes an integer value between 0 and 100, inclusive. The larger the value, the higher the priority. The priority 1320 takes a maximum priority value of 100 only when a predetermined condition is satisfied, and takes an integer value of 0 to 99 inclusive when the predetermined value is not satisfied. The execution control of the OS by hypervisor 1260 using the priority 1320 is described later, as part of the explanation of the variant scheduler 1265.

The explanation of module group 1200 resumes with reference to FIG. 12.

The OS priority updater 1261 has the following three functions.

Maximum Priority Updating Function: When an access start signal has been received by secure area start instructor 341 or by secure area start instructor 351, and the sender OS sending the access start signal is an OS identified by the OS ID 410 of the secure area management table 400 stored in the secure area management table storage 363, temporarily storing the priority 1320 associated with the OS ID 1310 indicating the sender OS in the variant OS ID management table 1300 stored in the variant OS ID management table storage 1262, then updating with the maximum priority value of 100.

Non-Maximum Priority Updating Function: When an access end signal has been received by secure area end instructor 342 or by secure area end instructor 352, and the sender OS sending the access end signal is an OS identified by the OS ID 410 of the secure area management table 400 stored in the secure area management table storage 363, updating the priority 1320 associated with the OS ID 1310 indicating the sender OS in the variant OS ID management table 1300 stored in the variant OS ID management table storage 1262 with the temporarily stored value.

Variant Rescheduling Request Function: When the priority 1320 of the OS ID management table 1300 stored in the variant OS ID management table storage 1262 has been updated, making a rescheduling request to the variant scheduler 1265 according to the updated variant OS ID management table 1300.

The variant scheduler 1265 has the following two functions.

First Variant Standard Scheduling Function: When a priority 1320 in the variant OS ID management table 1300 stored in the variant OS ID management table storage 1262 has a value other than 100, performing scheduling for each OS of each CPU such that the execution time ratio for each OS executed by the CPUs corresponds to the priority 1320 for each OS.

First Variant Limited Scheduling Function: When a priority 1320 in the variant OS ID management table 1300 stored in the variant OS ID management table storage 1262 has a logic value of 100, performing scheduling for each OS of each CPU such that for all CPUs, the OS being executed is limited to the OS identified by the OS ID 1310 corresponding to the priority 1320 having a value of 100.

The variant access control operator 1264 has the following two functions.

First Variant Secure Area Setting Function: When the priority 1320 in the variant OS ID management table 1300 stored in the variant OS ID management table storage 1262 has been updated to a value 100, and an identifier identical to the OS ID 1310 corresponding to the priority 1320 belongs to the OS ID 410 in the secure area management table 400 stored in the secure area management table storage 363, reading the start address 420, the end address 430, and the access permission 440 corresponding to the OS ID 410 and writing the start address 220, the end address 230, and the access permission 240 to a register in the control register group 131 to which only an initial value is written.

First Variant Secure Area Release Function: When the priority 1320 in the OS ID management table 1300 stored in the variant OS ID management table storage 1262 has been updated to have a value of 100, and an identifier identical to the OS ID 1310 corresponding to the priority 1320 access flag 530 belongs to the OS ID 410 in the secure area management table 400 stored in the secure area management table storage 363, rewriting the register in the control register group 131 to which the start address 420, the end address 430, and the access permission 440 corresponding to the OS ID 410 are written with an initial value, the initial value being a logic value of zero.

The operations of the first variant computer system, described above, are explained below with reference to the accompanying drawings.

(Operations)

The operations of the first variant computer system are described below, with particular attention to a first variant access start process, a first variant rescheduling process, a first variant secure area, and a first variant access end process.

(First Variant Access Start Process)

The first variant access start process is a partial variant of the access start process of Embodiment 1 (see FIG. 6) performed mainly by the hypervisor 1260, and is a process of, upon receiving a notification from OS a 340 or OS b 350 that access to the secure area 141 has started, rescheduling OS execution and setting the control register group 131 according the notification so received.

Figure 14:
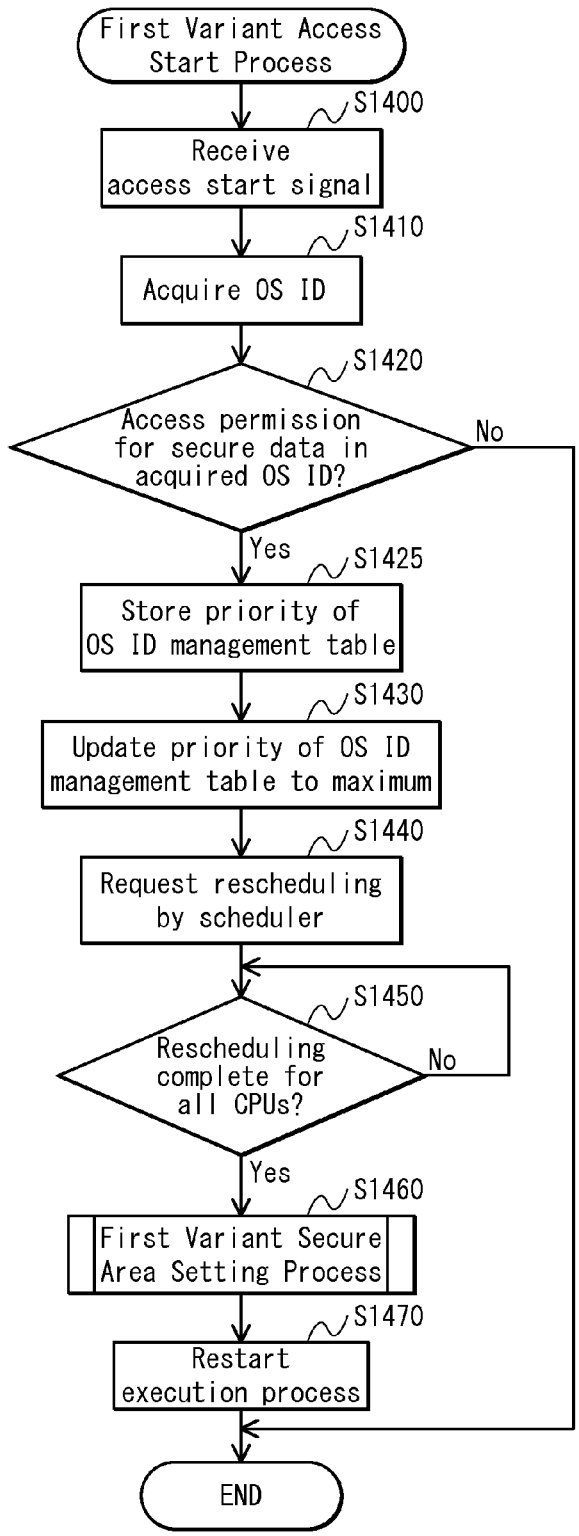
FIG. 14 is a flowchart of a first variant access start process.

FIG. 14 is a flowchart of the first variant access start process.

The first variant access start process begins with the secure area start instructor 341 of OS a 340 or the secure area start instructor 351 of OS b 350 detecting that a process executed by the OS including the module has started an access to the secure area 141, and sending a access start signal to the OS priority updater 1261.

Once the first variant access start process has begun, the OS priority updater 1261 receives the access start signal (step S1400).

Upon receiving the access start signal, the OS priority updater 1261 acquires the OS ID in the received access start signal (step S1410). The OS priority updater 1261 then investigates whether or not an identifier identical to the acquired OS ID is in the OS ID 410 field of the secure area management table 400 stored in the secure area management table storage 363, and thus investigates whether or not the OS identified by the acquired OS ID has an access permission to the consecutive memory area in the secure area 141 (step S1420).

When the access permission is found to be set in step S1420 (Yes in step S1420), i.e., when an identifier identical to the acquired OS ID is in the OS ID 410 field of the secure area management table 400 stored in the secure area management table storage 363, the OS priority updater 1261 temporarily stores the priority 1320 corresponding to the OS ID 1310 having the same identifier as the acquired OS ID in the variant OS ID management table 1300 stored in the variant OS ID management table storage 1262 (step S1425), and updates the priority 1320 with the maximum priority value of 100 (step S1430). Then, the OS priority updater 1261 makes a rescheduling request to the scheduler 1265 (step S1440).

Upon receiving the rescheduling request, the variant scheduler 1265 performs a later-described first variant rescheduling process, thus rescheduling each OS for each CPU such that the OS executed by all CPUs is the OS identified by the OS ID 1310 corresponding to the priority 1320 having the value of 100.

The execution controller 366 temporarily stops the execution of the OS for every CPU while the variant scheduler 1265 is performing the scheduling.

The variant access control operator 1264 stands by until the variant scheduler 1265 completes scheduling for all CPUs (repeated No in step S1450). Afterward (Yes in step S1450), the later-described first variant secure area setting process is performed, such that the start address 420, the end address 430, and the access permission 440 corresponding to the OS ID acquired by the OS priority updater 1261 are written to a register among the control register group 131 to which the initial value is written (step S1460).

The processing of Step 1470 is identical to the processing of step S670 from Embodiment 1 (see FIG. 6). Accordingly, the description thereof is omitted.

When the access permission is not found in step S620 (No in step S1420), i.e., when an identifier identical to the acquired OS ID is not included in the OS ID 410 field of the secure area management table 400 stored in the secure area management table storage 363, or when step S1470 is complete, the hypervisor 1260 ends the access start process.

(First Variant Rescheduling Process)

The first variant rescheduling process is a partial variant of the rescheduling process of Embodiment 1 (see FIG. 7) performed by the variant scheduler 1265 upon receiving a rescheduling request, and involves scheduling each OS for each CPU with reference to the variant OS ID management table 1300 stored in the variant OS ID management table storage 1262.

Figure 15:
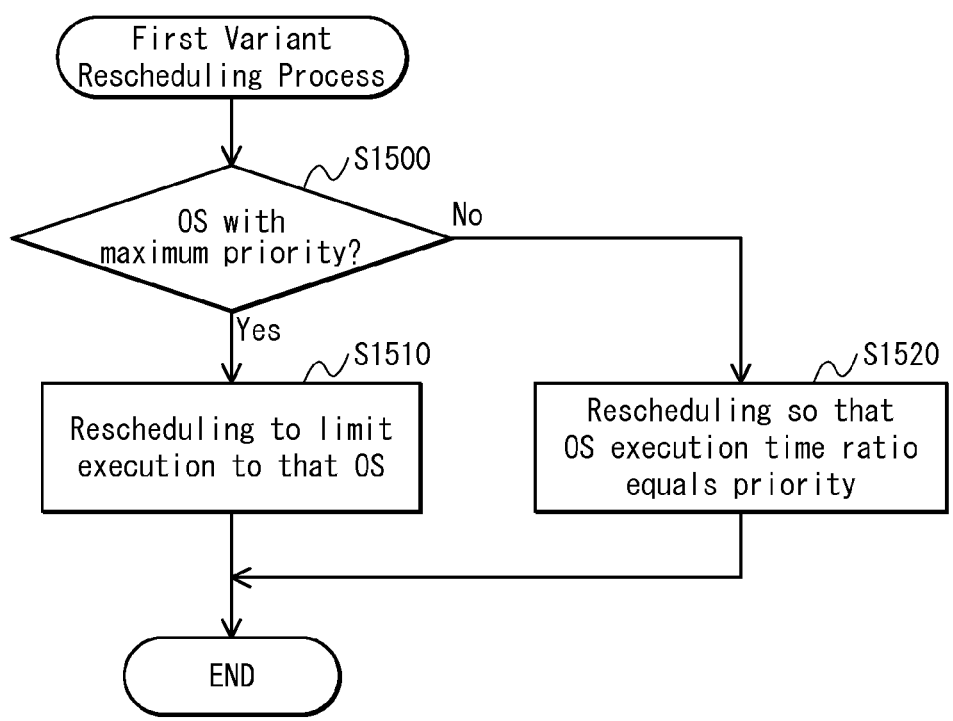
FIG. 15 is a flowchart of a first variant rescheduling process.

FIG. 15 is a flowchart of the first variant rescheduling process.

The first variant rescheduling process begins with the rescheduling request from the OS priority updater 1261.

Once the first variant rescheduling process begins, the variant scheduler 1265 investigates whether or not a priority 1320 having a value of 100 is present in the variant OS ID management table 1300 stored in the variant OS ID management table storage 1262 (step S1500).

When a priority 1320 of 100 is found in step S1500 (Yes in step S1500), the variant scheduler 1265 reschedules each OS for each CPU such that all CPUs execute only the OS identified by the OS ID 510 corresponding to the priority 1320 having the value of 100 (step S1510).

When a priority 1320 of 100 is not found in step S1500 (No in step S1500), the variant scheduler 1265 reschedules each OS for each CPU such that the execution time ratio for each OS executed by the CPUs corresponds to the priority 1320 ratio for each OS (step S1520).

When step S1510 or step S1520 is completed, the variant scheduler 1265 ends the first variant rescheduling process.

(First Variant Secure Area Setting Process)

The first variant secure area setting process is a partial variant of the secure area setting process of Embodiment 1 (see FIG. 8), performed by the variant access control operator 1264, and is a process of updating a register in the control register group 131 when the priority 1320 in the variant OS ID management table 1300 stored in the variant OS ID management table storage 1262 has been updated.

Figure 16:
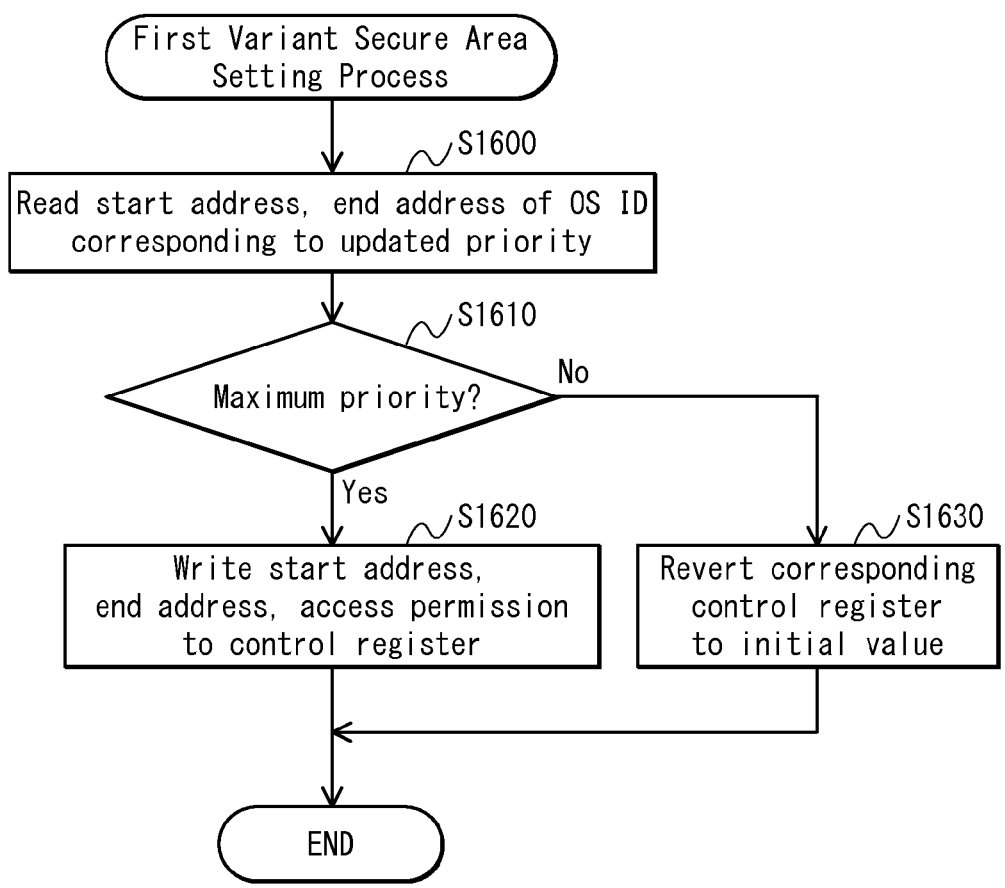
FIG. 16 is a flowchart of a first variant secure area setting process.

FIG. 16 is a flowchart of the first variant secure area setting process.

The first variant secure area setting process begins with the priority 1320 of the variant OS ID management table 1300 stored in the variant OS ID management table storage 1262 being updated to a value of 100, or from a value of 100 to another value.

Once the secure area setting process begins, the access control operator 364 references the secure area management table 400 stored in the secure area management table storage 363 and reads the start address 420, the end address 430, and the access permission 440 corresponding to the OS ID 410 field with the identifier identical to the OS ID 1310 corresponding to the updated priority 1320 (step S1600). The access control operator 364 then investigates whether or not the updated priority 1320 has a logic value of 100 (step S1610).

When a logic value of 100 is found in step S1610 (Yes in step S1610), the variant access control operator 364 writes the start address 220, the end address 230, and the access permission 240 to a register of the control register group 131 to which the initial value is written (step S1620).

When a logic value of 100 is not found in step S1610 (No in step S1610), the variant access control operator 1264 rewrites the register of the control register group 131 to which the values of the start address 420, the end address 430, and the access permission 440 corresponding to the OS ID 410 field with the identifier identical to the OS ID 510 corresponding to the updated priority 1320 are written with a logic value of zero, which is the initial value (step S1630).

When step S1620 or step S1630 is complete, the variant access control operator 1264 completes the first variant secure area setting process.

(First Variant Access End Process)

The first variant access end process is a partial variant of the access end process of Embodiment 1 (see FIG. 9) performed mainly by the hypervisor 1260, and is a process of, upon receiving a notification from OS a 340 or OS b 350 that access to the secure area 141 has ended, rescheduling OS execution and setting the control register group 131 according to the notification so received.

Figure 17:
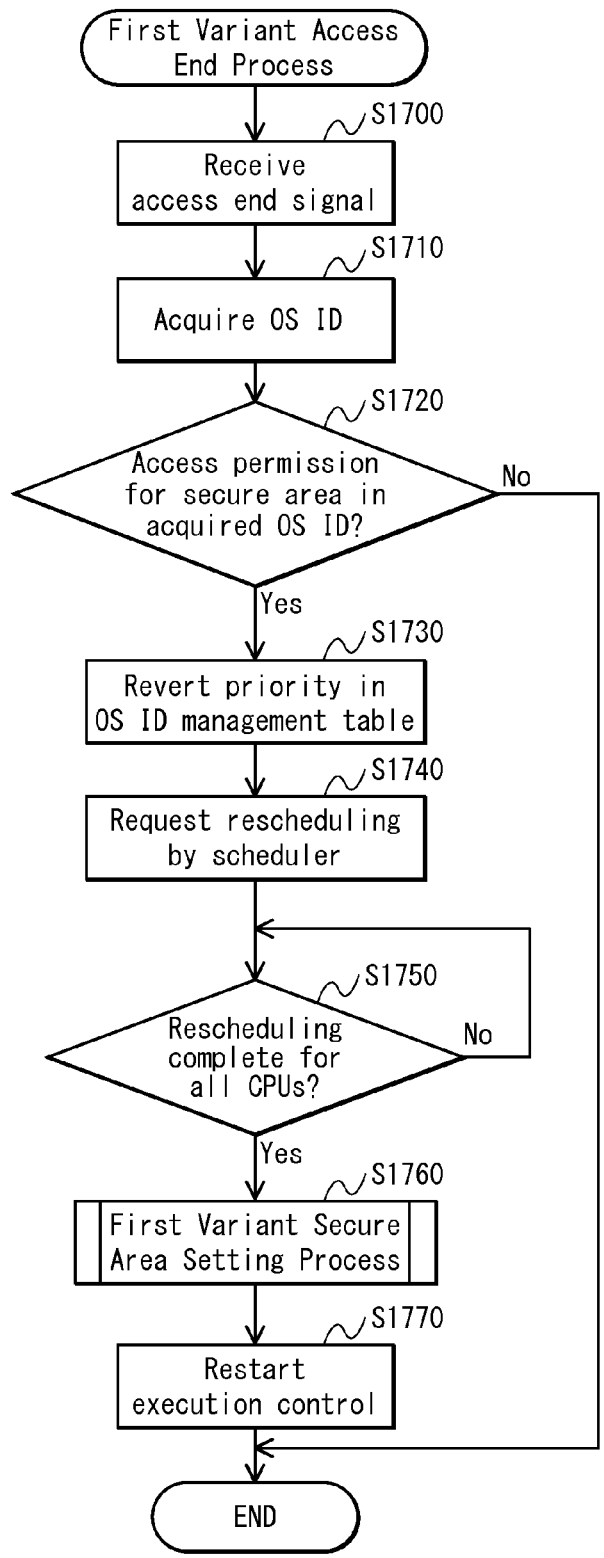
FIG. 17 is a flowchart of a first variant access end process.

FIG. 17 is a flowchart of the first variant access end process.

The first variant access end process begins with the secure area end instructor 342 of OS a 340 or the secure area end instructor 352 of OS b 350 detecting that a process executed by the OS including the module has ended the access to the secure area 141, and sending a access end signal to the OS priority updater 1261.

Once the first variant access end process has begun, the OS priority updater 1261 receives the access end signal (step S1700).

Upon receiving the access end signal, the OS priority updater 1261 acquires the OS ID in the received access end signal (step S1710). The OS priority updater 1261 then investigates whether or not an identifier identical to the acquired OS ID is in the OS ID 410 field of the secure area management table 400 stored in the secure area management table storage 363, and thus investigates whether or not the OS identified by the acquired OS ID has an access permission to the consecutive memory area in the secure area 141 (step S1720).

When the access permission is found to be set in step S1720 (Yes in step S1720), i.e., when an identifier identical to the acquired OS ID is in the OS ID 410 field of the secure area management table 400 stored in the secure area management table storage 363, the OS priority updater 1261 updates the priority 1320 corresponding to the OS ID 1310 having the same identifier as the acquired OS ID in the variant OS ID management table 1300 stored in the variant OS ID management table storage 1262 with the temporarily stored value (step S1730). Then, the OS priority updater 1261 makes a rescheduling request to the scheduler 1265 (step S1740).

Upon receiving the rescheduling request, the variant scheduler 1265 performs the above-described first variant rescheduling process, thus rescheduling each OS for each CPU such that the execution time ratio for each OS executed by the CPUs corresponds to the priority 1320 ratio for each OS.

The execution controller 366 temporarily stops the execution of the OS for every CPU while the variant scheduler 1265 is performing the scheduling.

The variant access control operator 1264 stands by until the variant scheduler 1265 completes scheduling for all CPUs (repeated No in step S1750). Afterward (Yes in step S1750), the previously-described first variant secure area setting process is performed, such that the register of the control register group 131 to which the values of the start address 420, the end address 430, and the access permission 440 corresponding to the OS ID 410 field with the identifier identical to the OS ID 510 corresponding to the updated priority 1320 are written is overwritten with a logic value of zero, which is the initial value (step S1760).

The processing of step 1770 is identical to the processing of step S970 from Embodiment 1 (see FIG. 9). Accordingly, the description thereof is omitted.

When the access permission is not found in step S1720 (No in step S1720), i.e., when an identifier identical to the acquired OS ID is not included in the OS ID 410 field of the secure area management table 400 stored in the secure area management table storage 363, or when step S1770 is complete, the hypervisor 360 ends the access end process.

Embodiment 3

(Outline)

The following describes a computer system 1800, which differs in part from the computer system 100 pertaining to Embodiment 1, as an Embodiment of the computer system pertaining to the present disclosure.

The computer system 1800 has a hardware configuration that partly differs from that of the computer system 100 pertaining to Embodiment 1, and also stores somewhat different programs in the memory 140 thereof.

The computer system 100 pertaining to Embodiment 1 is configured such that the secure area start instructor 341 or the secure area start instructor 351 in an ON detect the start of an access to the secure area 141. In contrast, the computer system 1800 pertaining to Embodiment 3 is configured such that the hypervisor detects the start of an access to the secure area 141 according to a memory access exception interrupt request signal transmitted by the access controller 130.

The following describes the computer system 1800 pertaining to Embodiment 3 with reference to the drawings, and centring on the points of difference from the computer system 100 pertaining to Embodiment 1.

(Configuration)

Figure 18:
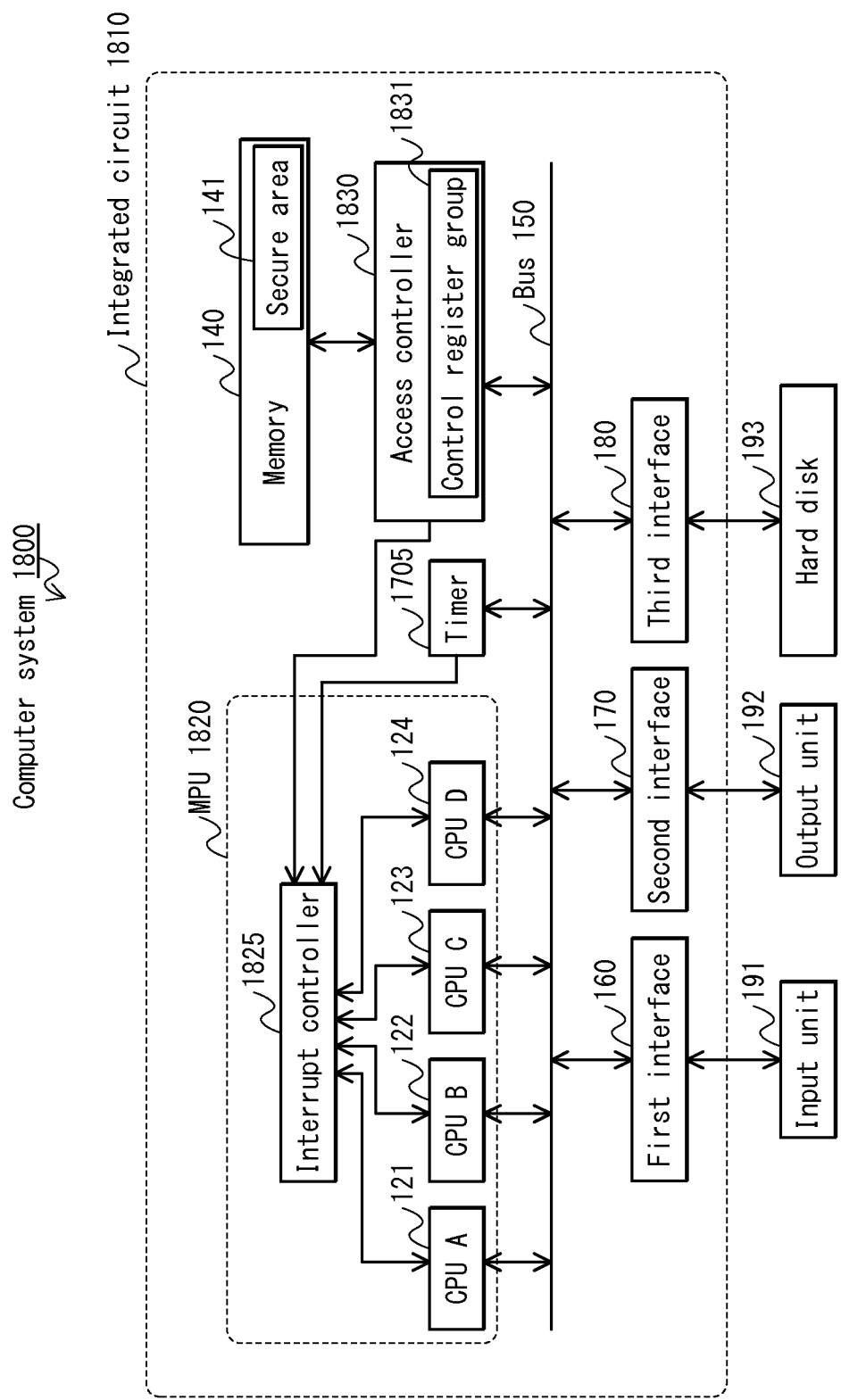
FIG. 18 is a block diagram indicating the principal hardware configuration of a computer system 1800.

FIG. 18 is a block diagram indicating the principal hardware configuration of a computer system 1800.

As shown, the computer system 1800 differs from the computer system 100 pertaining to Embodiment 1 (see FIG. 1) in the addition of a timer 1705, and in that the interrupt controller 125 is replaced with an interrupt controller 1825. Also, according to the modification of the interrupt controller 1825, the MPU 120 is replaced with an MPU 1820.

The timer 1705 is connected to the bus 150, is controlled by the CPUs A 121 through D 124, clocks a time designated by one of the CPUs A 121 through D 124, and transmits a timer interrupt request signal to the interrupt controller 1825 when the designated time has elapsed.

Here, the timer interrupt request signal includes information specifying the CPU defining the clocked time.

The interrupt controller 1825 is connected to the access controller 130 and to the CPUs A 121 through D 124, and has the following two functions.

Memory Access Exception Notification Function: Upon receiving the memory access exception interrupt request signal from the access controller 130, specifying the CPU that attempted a forbidden memory access (hereinafter, accessing CPU) and performing a memory access exception interruption on the specified accessing CPU that is specifiable thereby.

Timer Interrupt Notification Function: Upon receiving the timer interrupt request signal from the timer 1705, specifying the CPU that has designated the clocked time and performing a timer interruption on the specified CPU, specifiable thereby, indicating that the clocking by the timer has ended.

Figure 19:
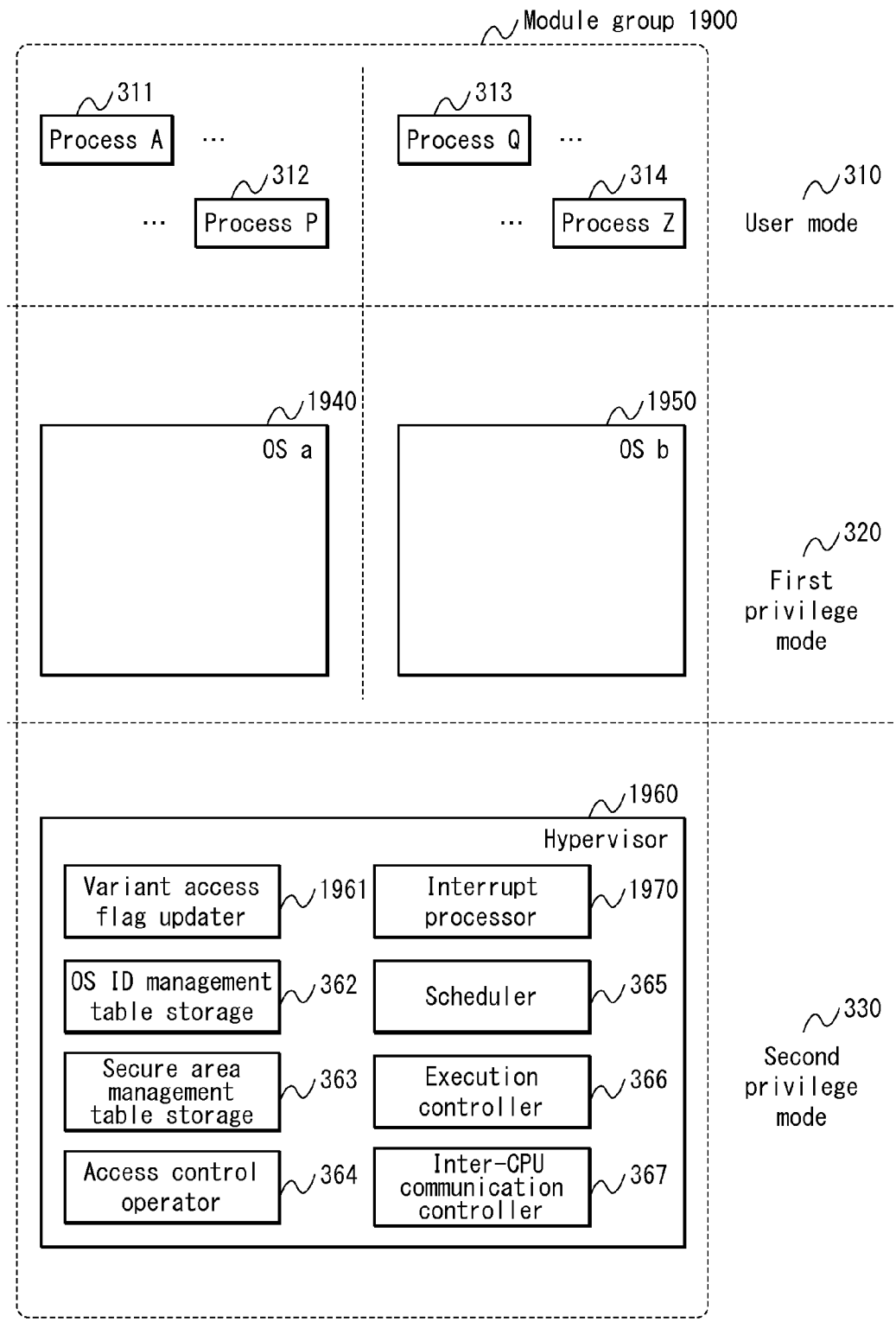
FIG. 19 is a schematic diagram of a module group 1900.

FIG. 19 is a schematic diagram representing a module group 1900 subject to execution on the CPUs A 121 through D 124 in the computer system 1800.

As shown, module group 1900 differs from the module group 300 pertaining to Embodiment 1 (see FIG. 2) in that OS a 340 is replaced by OS a 1940 in which the secure area start instructor 341 and the secure area end instructor 342 have been deleted, in that OS b 350 has been replaced with OS b 1950 in which the secure area start instructor 351 and the secure area end instructor 352 have been deleted, in that the access flag updater 361 has been replaced with a variant access flag updater 1961, and in the addition of an interrupt processor 1970. According to these modifications, hypervisor 360 is replaced with hypervisor 1960.

The interrupt processor 1970 has the following three functions.

Memory Access Exception Notification Function: Detecting a memory access exception interruption by the interrupt controller 1825 on any of the CPUs A 121 through D 124, specifying the OS executed by the interrupted CPU, and transmitting a memory access exception notification signal that includes information identifying the specified OS to the variant access flag updater 1961.

Timer End Notification Function: Detecting a timer interruption by the interrupt controller 1825 on any of the CPUs A 121 through D 124, specifying the OS executed by the interrupted CPU, and transmitting a timer end notification signal that includes information identifying the specified OS to the variant access flag updater 1961.

Memory Access Interruption Processing Function: Upon detecting a memory access exception interruption by the interrupt controller 1825 on any of the CPUs A 121 through D 124 when a predetermined condition is satisfied, performing a memory access forbidding process determined in advance for cases where access has been forbidden.

In addition to the rescheduling request function of the access flag updater 361 pertaining to Embodiment 1, the variant access flag updater 1961 has the following two functions.

First Variant Access Flag One-Update Function: When a memory access exception notification signal has been received by the interrupt processor 1970, and the OS specified by the memory access exception notification signal is an OS identified by the OS ID 410 of the secure area management table 400 stored in the secure area management table storage 363, updating the access flag 530 associated with the OS ID 510 identifying the sender OS within the OS ID management table 500 stored in the OS ID management table storage 362 with a logic value of one.

First Variant Access Flag Zero-Update Function: When a timer end notification signal has been received by the interrupt processor 1970, and the OS specified by the timer end notification signal is an OS identified by the OS ID 410 of the secure area management table 400 stored in the secure area management table storage 363, updating the access flag 530 associated with the OS ID 510 identifying the sender OS within the OS ID management table 500 stored in the OS ID management table storage 362 with a logic value of zero.

The operations of the computer system 1800, described above, are explained below with reference to the accompanying drawings.

(Operations)

The operations of the computer system 1800 are described below, with particular attention to a second variant access start process, a second variant rescheduling process, a second variant secure area, and a second variant access end process.

(Second Variant Access Start Process)

The second variant access start process is a partial variant of the access start process of Embodiment 1 (see FIG. 6) performed mainly by the hypervisor 1960, and is a process of, upon the interrupt processor 1970 detecting a memory access exception interruption by the interrupt controller 1825 on one of the CPUs A 121 through D 124, rescheduling OS execution and setting the control register group 131 according the memory access exception interruption so received.

Figure 20:
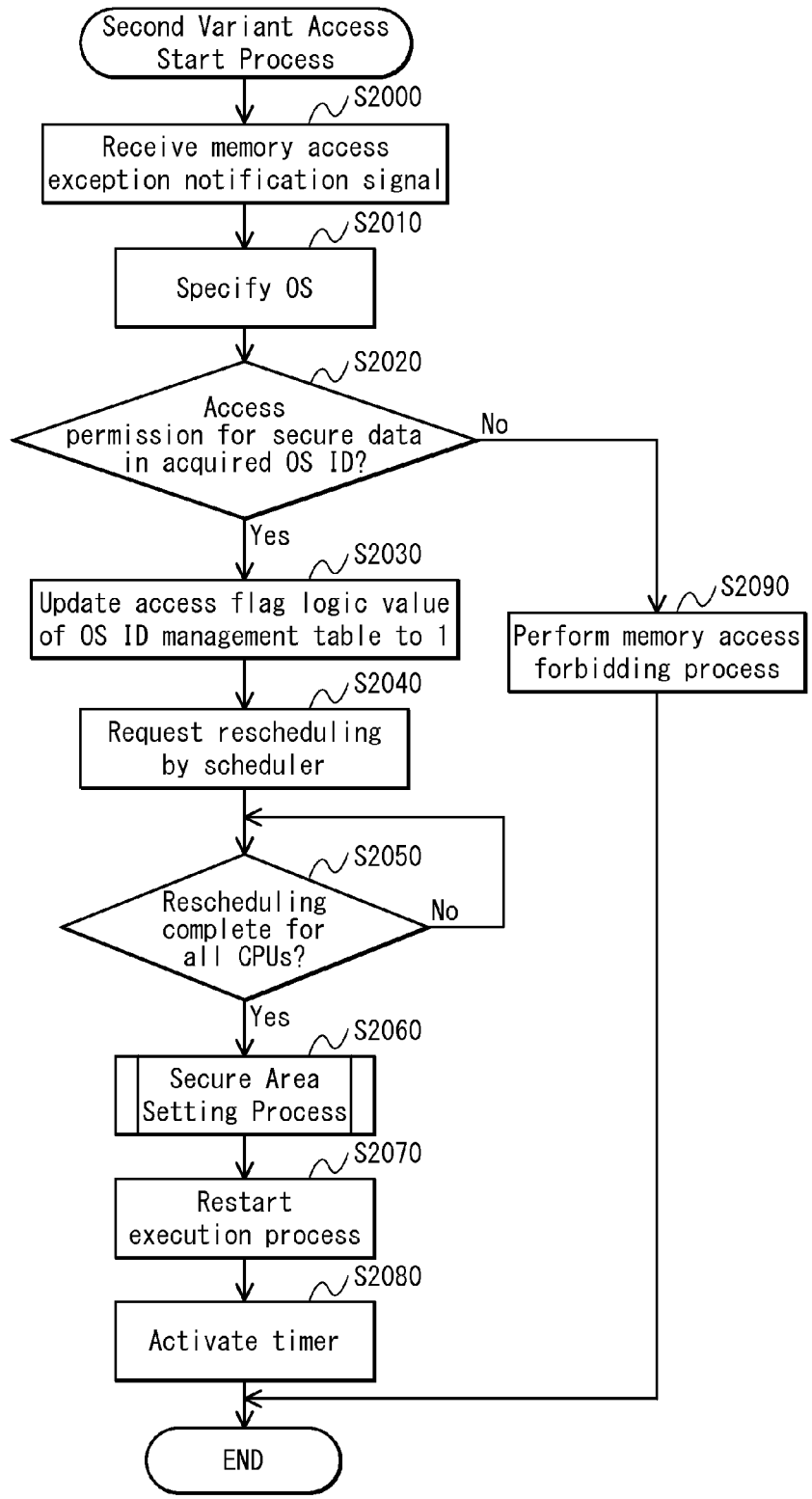
FIG. 20 is a flowchart of a second variant access start process.

FIG. 20 is a flowchart of the second variant access start process.

The second variant access start process begins with the interrupt processor 1970 detecting a memory access exception interruption by the interrupt controller 1825 on any of the CPUs A 121 through D 124, specifying the OS executed by the interrupted CPU, and transmitting a memory access exception notification signal that includes information identifying the specified OS to the variant access flag updater 1961.

Once the second variant access start process has begun, the variant access flag updater 1961 receives the memory access exception notification signal (step S2000).

Upon receiving the memory access exception notification signal, the variant access flag updater 1961 specifies the OS specified by the received memory access exception notification signal (step S2010). The variant access flag updater 1961 then investigates whether or not the specified OS is identified by the OS ID 410 field of the secure area management table 400 stored in the secure area management table storage 363 (see FIG. 4), and thus investigates whether or not the specified OS has an access permission to the consecutive memory area in the secure area 141 (step S2020).

When the access permission is found in step S2020 (Yes in step S2020), i.e., when the specified OS ID is identified by the OS ID 410 field of the secure area management table 400 stored in the secure area management table storage 363, the variant access flag updater 1961 updates the access flag 530 associated with the OS ID 510 of the identifier identical to the acquired OS ID in the OS ID management table 500 stored in the OS ID management table storage 362 to have a logic value of one (step S2030).

The processing of steps 2040 through 2070 is similar to steps S640 through S670, respectively, of the access start process of Embodiment 1, differing therefrom only in that the access flag updater 361 is replaced by the variant access flag updater 1961. Accordingly, the description thereof is omitted.

Once the operations of step S2070 are complete, the access control operator 364 causes the timer 1705 to begin to clock a predetermined time (e.g., 1 μs) (step S2080).

When the access permission is not found in step S2020 (No in step S2020), i.e., when the specified OS is not identified by the OS ID 410 of the secure area management table 400 stored in the secure area management table storage 363, the interrupt processor 1970 performs the memory access forbidding process (step S2090).

When step S2080 or step S2090 is complete, the hypervisor 1960 ends the second variant access start process.

(Second Variant Access End Process)

The second variant access end process is a partial variant of the access end process of Embodiment 1 (see FIG. 9) performed mainly by the hypervisor 1960, and is a process of, upon the interrupt processor 1970 detecting a timer interruption by the timer 1705 on one of the CPUs A 121 through D 124, rescheduling OS execution and setting the control register group 131 according the timer interruption.

Figure 21:
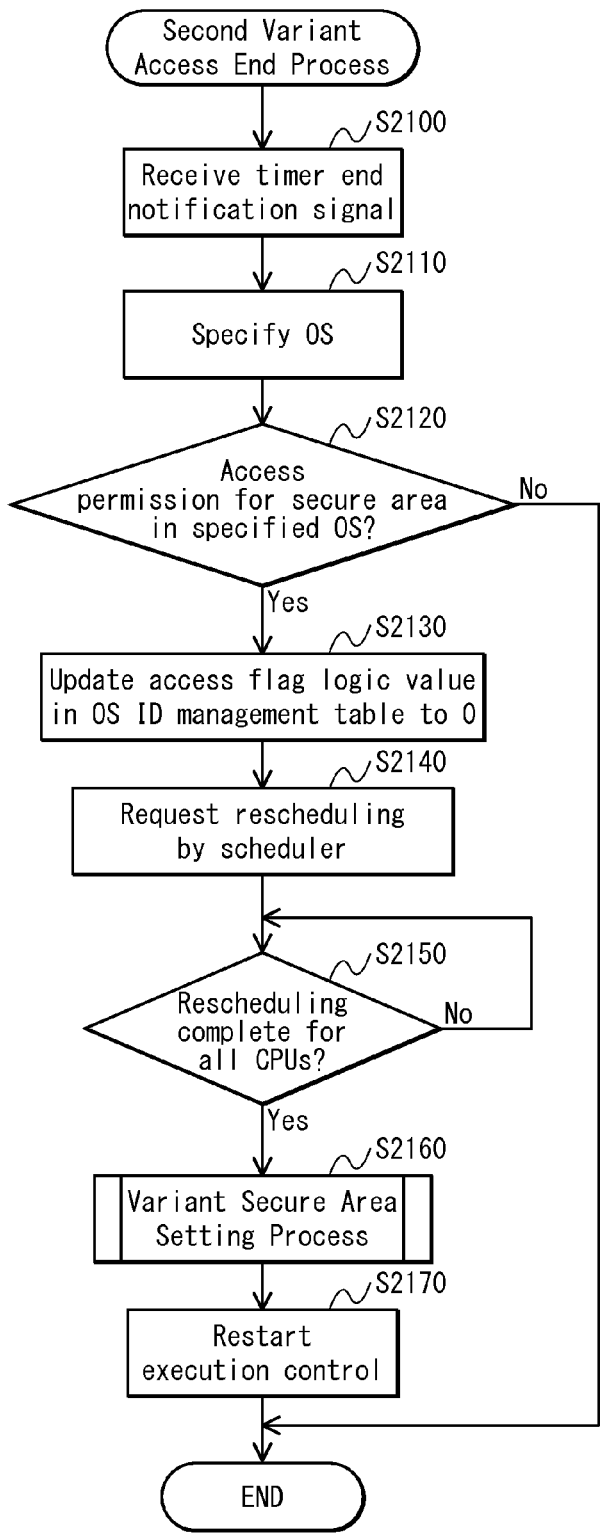
FIG. 21 is a flowchart of a second variant access end process.

FIG. 21 is a flowchart of the second variant access end process.

The second variant access end process begins with the interrupt processor 1970 detecting a timer interruption by the interrupt controller 1825 on one of the CPUs A 121 through D 124, specifying the OS executed by the interrupting CPU, an transmitting a timer end notification signal that includes information identifying the specified OS to the variant access flag updater 1961.

Once the second variant access end process has begun, the variant access flag updater 1961 receives the timer end notification signal (step S2100).

Upon receiving the timer end exception notification signal, the variant access flag updater 1961 specifies the OS specified by the received timer end exception notification signal (step S2110). The variant access flag updater 1961 then investigates whether or not the specified OS is identified by the OS ID 410 field of the secure area management table 400 stored in the secure area management table storage 363 (see FIG. 4), and thus investigates whether or not the specified OS has an access permission to the consecutive memory area in the secure area 141 (step S2120).

When the access permission is found in step S2120 (Yes in step S2120), i.e., when the specified OS ID is identified by the OS ID 410 field of the secure area management table 400 stored in the secure area management table storage 363, the variant access flag updater 1961 updates the access flag 530 associated with the OS ID 510 of the identifier identical to the acquired OS ID in the OS ID management table 500 stored in the OS ID management table storage 362 to have a logic value of zero (step S2130).

The processing of steps 2140 through 2170 is similar to steps S940 through S970, respectively, of the access end process of Embodiment 1, differing therefrom only in that the access flag updater 361 is replaced by the variant access flag updater 1961. Accordingly, the description thereof is omitted.

When the access permission is not found in step S2120 (No in step S2120), i.e., when the specified OS is not included in the OS ID 410 field of the secure area management table 400 stored in the secure area management table storage 363, or when step S2170 is complete, the hypervisor 1960 ends the second variant access end process.

Embodiment 4

(Outline)

The following describes a second variant computer system, which differs in part from the computer system 100 of Embodiment 2, as an Embodiment of the computer system pertaining to the present disclosure.

The second variant computer system is similar to the computer system 100 of Embodiment 1 in terms of hardware configuration, but stores somewhat different programs in the memory 140 thereof.

The computer system 100 pertaining to Embodiment 1 has been described in terms of the configuration of the OS performing execution control of a process, and of the hypervisor performing execution control of the OS. In contrast, the second variant computer system pertaining to Embodiment 4 does not includes the hypervisor, and is described in terms of the configuration of an OS performing execution control for a process at the process group level, where one or more processes form a group.

The following describes the second variant computer system pertaining to Embodiment 4 with reference to the drawings, and centring on the points of difference from the computer system 100 pertaining to Embodiment 1.

(Configuration)

The hardware configuration of the second variant computer system is identical to that of the computer system 100 pertaining to Embodiment 1. Accordingly, the description thereof is omitted.

In contrast, a subset of the programs stored in the memory 140 differ from those of the computer system 100 pertaining to Embodiment 1. Accordingly, a portion of the module group subject to operation by the CPUs A 121 through D 124 differs from the computer system 100 of Embodiment 1.

Figure 22:
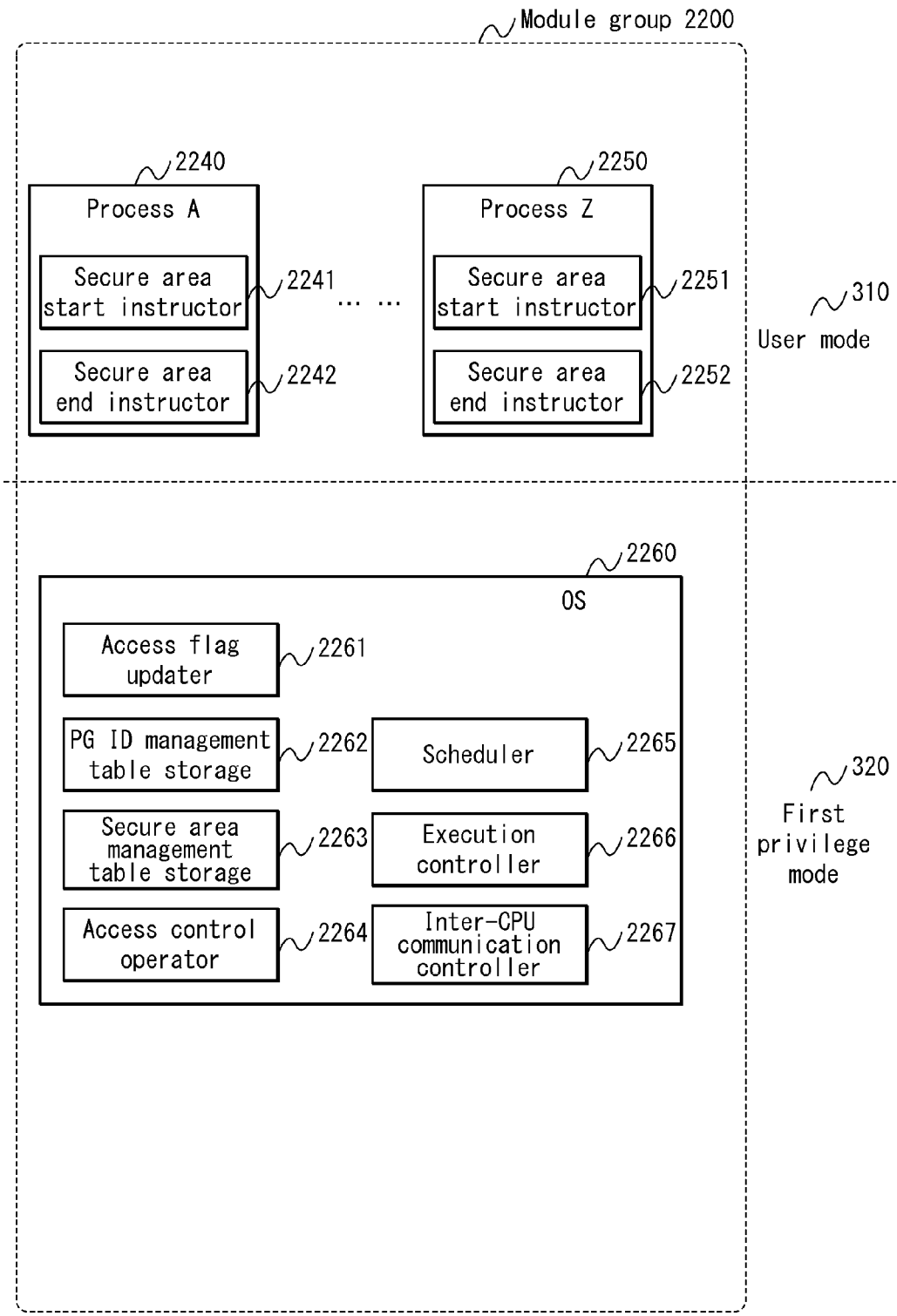
FIG. 22 is a schematic diagram of a module group 2200.

FIG. 22 is a schematic diagram representing module group 2200 subject to execution on the CPUs A 121 through D 124 in the second variant computer system.

As shown, module group 2200 includes processes A 2240 through Z 2250 executed in the user mode 310 and OS 2260 executed in the first privilege mode 320.

OS 2260 is an operating system performing execution control of processes A 2240 through Z 2250 at the process group, the group being made up of one or more processes, that includes access flag updater 2261, a process group (hereinafter, PG) ID management table storage 2262, secure area management table storage 2263, access control operator 2264, scheduler 2265, execution controller 2266, and inter-CPU communication controller 2267.

Here, OS 2260 performs execution control on the processes such that each CPU executes one process group at any given time.

Each of the processes A 2240 through Z 2250 is a task generated by one the CPUs A 121 through D 124 executing an application, and includes a secure area start instructor (secure area start instructor 2241, secure area start instructor 2251, and so on) and a secure area end instructor (secure area end instructor 2242, secure area end instructor 2252, and so on).

Secure area start instructor 2241 detects the start of an access to the secure area 141 performed by a process being controlled by the process that includes the secure area start instructor 2241, and transmits a variant access start signal indicating that the access to the secure area 141 has started to the access flag updater 2261. Here, the variant access start signal includes a PG ID identifying the process group that includes the process sending the signal.

Secure area end instructor 2242 detects the end of the access to the secure area 141 performed by the process that includes the secure area end instructor 2242, and transmits a variant access end signal indicating that the access to the secure area 141 has ended to the access flag updater 361. Here, the variant access end signal includes a PG ID identifying the process group that includes the process sending the signal.

Secure area start instructor 2251 and secure area end instructor 2252 are similar to the secure area start instructor 2241 and the secure area end instructor 2242, respectively. Accordingly, the explanation thereof is omitted.

Secure area management table storage 2263 stores a variant secure area management table 2300.

FIG. 23 is a data configuration diagram indicating a sample data configuration of the secure area management table 2300.

As shown, the variant secure area management table 2300 indicates the associations between a PG ID 2310, a start address 2320, an end address 2330, and an access permission 2340.

The PG ID 2310 is an identifier identifying the process group.

Here, the process groups identified by respective PG IDs 2310 1, 2, and 9 are secure process groups made up of processes each generated by executing a secure application. A process group identified by a PG ID 2310 other than 1, 2, and 9 is a non-secure process group made up of processes each generated by executing a non-secure application.

The start address 2320 and the end address 2330 are fields for respectively storing the start address and the end address of a consecutive memory portion of the secure area.

The access permission 2340 is access information indicating an access permit from a process in a process group identified by the corresponding PG ID 2310 to the consecutive memory portion designated by the start address 2320 and the end address 2330.

This access information is similar to the access information of access permission 240 pertaining to Embodiment 1. Accordingly, the explanation thereof is omitted.

Here, the variant secure area management table 2300 is a table determined in advance, during system development, the contents of which are not updatable.

The explanation of module group 300 resumes with reference to FIG. 22.

The PG ID management table storage 2262 stores a PG ID management table 2400.

FIG. 24 is a data configuration diagram indicating a sample data configuration of the PG ID management table 2400.

As shown, the PG ID management table 2400 indicates the associations between a PG ID 2410, a priority 2420, a PID 2430, and an access flag 2440.

The PG ID 2410 is, like the PG ID 2310, an identifier identifying the process group.

The priority 2420 is an execution priority for the process group identified by the corresponding PG ID 2410 when the OS 2260 performs execution control of the process.

Here, the priority 2420 takes an integer value between 0 and 99, inclusive. The larger the value, the higher the priority. The execution control of the process by the OS 2260 using the priority 2420 is described later, as part of the explanation of the scheduler 2265.

The P (Process) ID 2430 is an identifier identifying a process in the process group identified by the corresponding PG ID 2410.

The access flag 2440 is a flag indicating whether or not the process in the process group identified by the PG ID 2410 is accessing the secure area 141.

Here, the access flag 2440 is set to a logic value of one to indicate that the secure area 141 is being accessed, and is set to a logic value of zero to indicate that the secure area 141 is not being accessed.

The explanation of module group 2200 resumes with reference to FIG. 22.

The access flag updater 2261 has the following three functions.

Second Variant Access Flag One-Update Function: When a variant access start signal is received by the secure area start instructor (i.e., the secure area start instructor 2241, secure area start instructor 2251, and so on), and the sender process sending the variant access start signal is a process in the process group identified by the PG ID 2310 of the variant secure area management table 2300 stored in the secure area management table storage 2263, updating the access flag 2440 corresponding to the PID 2430 identifying the sender process in the PG ID management table 2400 stored in the PG ID management table storage 2262 with a logic value of one.

Second Variant Access Flag Zero-Update Function: When a variant access end signal is received by the secure area end instructor (i.e., the secure area end instructor 2242, secure area end instructor 2252, and so on), and the sender process sending the variant access end signal is a process in the process group identified by the PG ID 2310 of the variant secure area management table 2300 stored in the secure area management table storage 2263, updating the access flag 2440 corresponding to the PID 2430 identifying the sender process in the PG ID management table 2400 stored in the PG ID management table storage 2262 with a logic value of zero.

Variant Rescheduling Request Function: When the access flag 2440 of the PG ID management table 2400 stored in the PG ID management table storage 2262 has been updated, making a rescheduling request to the scheduler 2265 according to the updated PG ID management table 2400.

The scheduler 2265 has the following two functions.

Second Variant Standard Scheduling Function: When all logic values for the access flag 2440 in the PG ID management table 2400 stored in the PG ID management table storage 2262 are zero, performing scheduling for each process of each CPU such that the execution time ratio for each process belonging to each process group executed by the CPUs corresponds to the priority 2420 for each process group.

Second Variant First Variant Limited Scheduling Function: When a logic value of one is found in the access flag 2440 in the PG ID management table 2400 stored in the PG ID management table storage 2262, performing scheduling for each process of each CPU such that for all CPUs, the process being executed is limited to the process belonging to the process group identified by the PG ID 2410 corresponding to the access flag 2440 having the logic value of 1.

An execution controller 2266 performs execution control of the process for all CPUs in accordance with the execution schedule scheduled by the scheduler 2265.

The execution controller 2266 temporarily stops the execution of every process while the scheduler 2265 is performing the scheduling.

The inter-CPU communication controller 2267 has the same functions as the inter-CPU communication controller 367 of Embodiment 1. Accordingly, the description thereof is omitted.

The access control operator 2264 has the following two functions.

Second Variant Secure Area Setting Function: When the logic value of the access flag 2440 in the PG ID management table 2400 stored in the PG ID management table storage 2262 has been updated to read one, and an identifier identical to the PG ID 2410 corresponding to the access flag 2440 belongs to the PG ID 2410 in the variant secure area management table 2300 stored in the secure area management table storage 2263, reading the start address 2320, the end address 2330, and the access permission 2340 corresponding to the PG ID 2310 and writing the start address 2320, the end address 2330, and the access permission 2340 to a register in the control register group 131 to which only an initial value is written.

Second Variant Secure Area Release Function: When the logic value of the access flag 2440 in the PG ID management table 2400 stored in the PG ID management table storage 2262 has been updated to have a value of zero, and an identifier identical to the PG ID 2410 corresponding to the access flag 240 belongs to the PG ID 2410 in the variant secure area management table 2300 stored in the secure area management table storage 2263, rewriting the register in the control register group 131 to which the start address 2320, the end address 2330, and the access permission 2340 corresponding to the OS ID 410 are written with an initial value, the initial value being a logic value of zero.

The operations of the second variant computer system, described above, are explained below with reference to the accompanying drawings.

(Operations)

The operations of the computer system 100 are described below, with particular attention to a third variant access start process, a second variant rescheduling process, a second variant secure area setting process, and a third variant access end process.

(Third Variant Access Start Process)

The third variant access start process is a partial variant of the access start process of Embodiment 1 (see FIG. 6) performed mainly by the OS 2260, and is a process of, upon receiving, from a process, a notification that access to the secure area 141 has started, rescheduling process execution and setting the control register group 131 according the notification so received.

Figure 25:
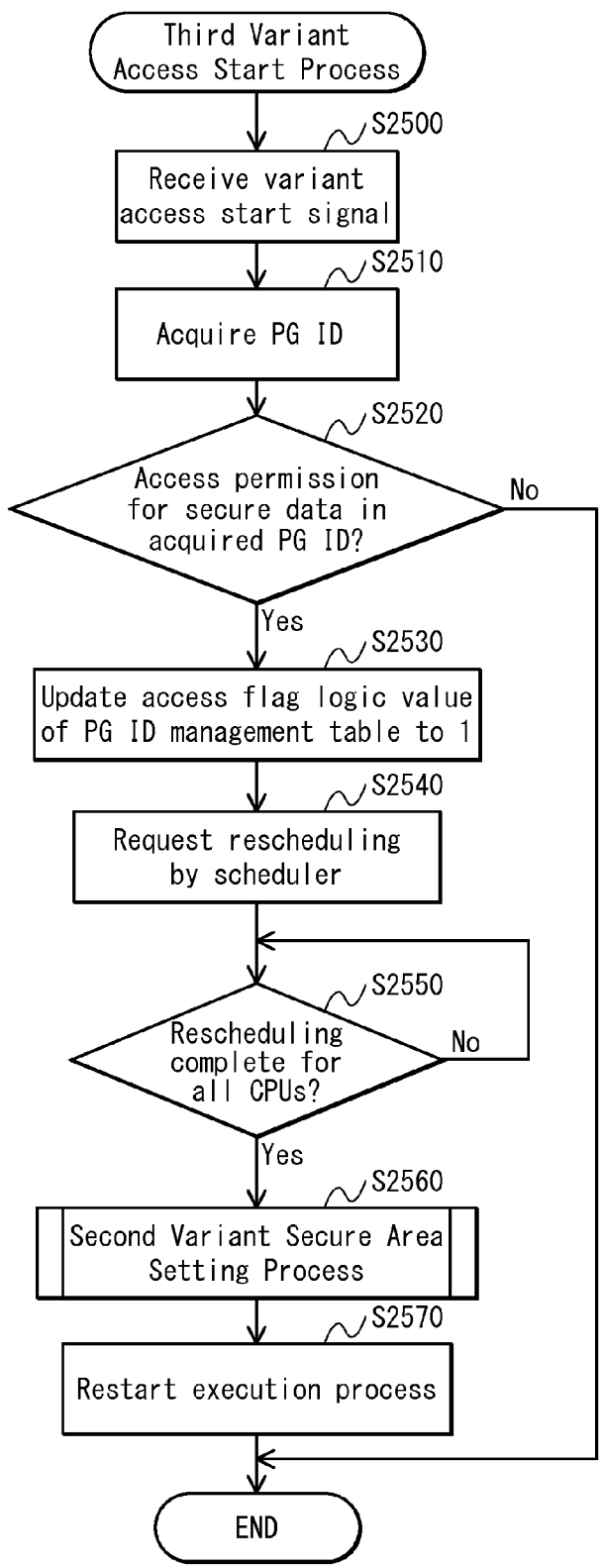
FIG. 25 is a flowchart of a third variant access start process.

FIG. 25 is a flowchart of the third variant access start process.

The third variant access start process begins with the secure area start instructor (secure area start instructor 2241, secure area start instructor 2251, and so on) detecting the start of an access to the secure area 141 by a process in the module that includes the secure area start instructor, and sending a variant access start signal to the access flag updater 2261.

Once the third variant access start process has begun, the access flag updater 2261 receives the variant access start signal (step S2500).

Upon receiving the variant access start signal, the access flag updater 2261 acquires the PG ID in the received variant access start signal (step S2510). The access flag updater 2261 then investigates whether or not an identifier identical to the acquired PG ID is in the PG ID 2310 field of the variant secure area management table 2300 stored in the secure area management table storage 2263, and thus investigates whether or not the process group identified by the acquired PG ID has an access permission to the consecutive memory area in the secure area 141 (step S2520).

When the access permission is found in step S2520 (Yes in step S2520), i.e., when the acquired PG ID is in the PG ID 2310 field of the variant secure area management table 2300 stored in the secure area management table storage 2263, the access flag updater 2261 updates the access flag 2440 associated with the PG ID 2410 identical to the acquired PG ID in the PG ID management table 2400 stored in the PG ID management table storage 2262 to have a logic value of one (step S2530). Then, the access flag updater 2261 makes a rescheduling request to the scheduler 2265 (step S2540).

Upon receiving a rescheduling request, the scheduler 2265 performs the later-described second variant rescheduling process, and thus performs execution scheduling for each process of all CPUs such that the process executed by each CPU is limited to a process belonging to the process group identified by the PG ID 2410 corresponding to the access flag 2440 having the logic value of one.

The execution controller 2266 temporarily stops the execution of the process for every CPU while the scheduler 2265 is performing the scheduling.

The access control operator 2264 stands by until the scheduler 2265 completes scheduling for all CPUs (repeated No in step S2550). Afterward (Yes in step S2550), the later-described second variant secure area setting process is performed, such that the start address 2320, the end address 2330, and the access permission 2340 corresponding to the PG ID acquired by the access flag updater 2261 are written to a register among the control register group 131 to which the initial value is written (step S2560).

Once writing to the register of the control register group 131 is finished, the access control operator 2264 makes a notification to the execution controller 2266 indicating that the writing to the register is complete. The execution controller 2266 then resumes execution control of the process for all CPUs (step S2570).

When the access permission is not found in step S2520 (No in step S2520), i.e., when an identifier identical to the acquired PG ID is not in the PG ID 2310 field of the variant secure area management table 2300 stored in the secure area management table storage 2263, or when step S2570 is complete, the OS 2260 completes the third variant access start process.

(Second Variant Rescheduling Process)

The rescheduling process is a partial variant of the rescheduling process of Embodiment 1 (see FIG. 7) performed by the scheduler 365, and is a process of referencing the OS ID management table 500 stored in the OS ID management table storage 362 to schedule each OS for each CPU when rescheduling has been requested.

Figure 26:
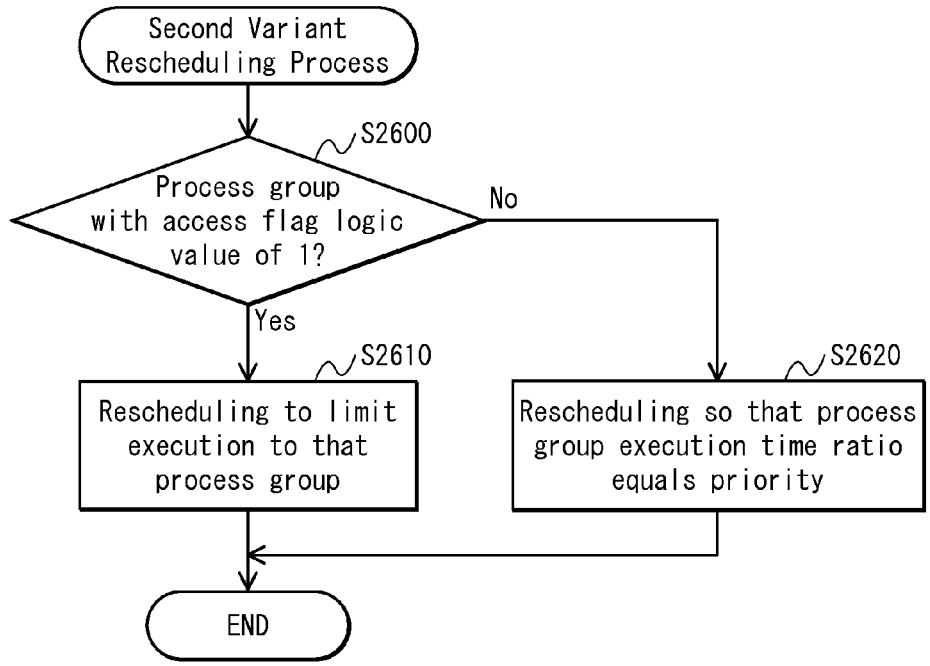
FIG. 26 is a flowchart of a second variant rescheduling process.

FIG. 26 is a flowchart of the second variant rescheduling process.

The second variant rescheduling process begins with the rescheduling request from the access flag updater 2261.

Once the rescheduling process begins, the scheduler 2265 investigates whether or not an access flag 2440 having a logic value of one is present in the PG ID management table 2400 stored in the PG ID management table storage 2262 (step S2600).

When an access flag 2440 having a logic value of one is found in step S2600 (Yes in step S2600), the scheduler 2265 performs execution scheduling for each process of each CPU such that, for all CPUs, the process executed thereby is limited to a process belonging to the process group identified by the PG ID 2410 corresponding to the access flag 2440 (step S2610).

When an access flag 2440 having a logic value of one is not found in step S2600 (No in step S2600), the scheduler 2265 performs the execution scheduling such that, for all CPUs, the execution time ratio a process belonging to each process group executed by each CPU corresponds to the priority 2420 ratio for each process group.

When step S2610 or step S2620 is completed, the scheduler 2265 ends the second variant rescheduling process.

(Second Variant Secure Area Setting Process)

The second variant secure area setting process is a partial variant of the secure area setting process of Embodiment 1 (see FIG. 8) performed by the access control operator 2264, and is a process of updating a register in the control register group 131 when the access flag 2440 of the PG ID management table 2400 stored in the PG ID management table storage 2262 has been updated.

Figure 27:
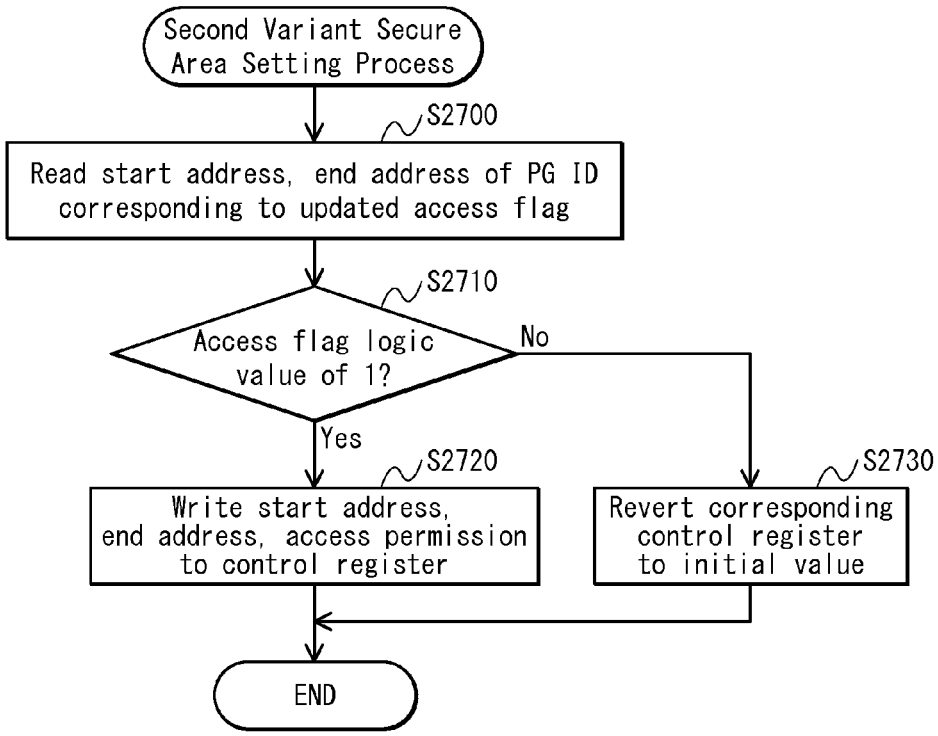
FIG. 27 is a flowchart of a second variant secure area setting process.

FIG. 27 is a flowchart of the second variant secure area setting process.

The second variant secure area setting process begins with an update to the access flag 2440 of the PG ID management table 2400 stored in the PG ID management table storage 2262.

Once the second variant secure area setting process begins, the access control operator 2264 references the variant secure area management table 2300 stored in the secure area management table storage 2263 and reads the start address 2320, end address 2330, and access permission 2340 corresponding to the PG ID 2210 having the same identifier as the PG ID 2410 field of the updated access flag 2440 (step S2700). The access control operator 2264 then investigates whether or not the updated access flag 2440 has a logic value of one (step S2710).

When a logic value of one is found in step S2710 (Yes in step S2710), the access control operator 2264 writes the start address 220, the end address 230, and the access permission 240 to a register of the control register group 131 to which the initial value is written (step S2720).

When a logic value of zero is found in step S2710 (No in step S2710), the access control operator 2264 rewrites the register of the control register group 131 to which the values of the start address 420, the end address 430, and the access permission 440 corresponding to the PG ID 2310 field with the identifier identical to the PG ID 2410 corresponding to the updated access flag 2440 are written with a logic value of zero, which is the initial value (step S2730).

When step S2720 or step S2730 is complete, the variant access control operator 2264 completes the second variant secure area setting process.

(Third Variant Access End Process)

The third variant access end process is a partial variant of the access end process of Embodiment 1 (see FIG. 9) performed mainly by the OS 2260, and is a process of, upon receiving a notification from a process to the effect that access to the secure area 141 has started, rescheduling process execution and setting the control register group 131 according the notification so received.

Figure 28:
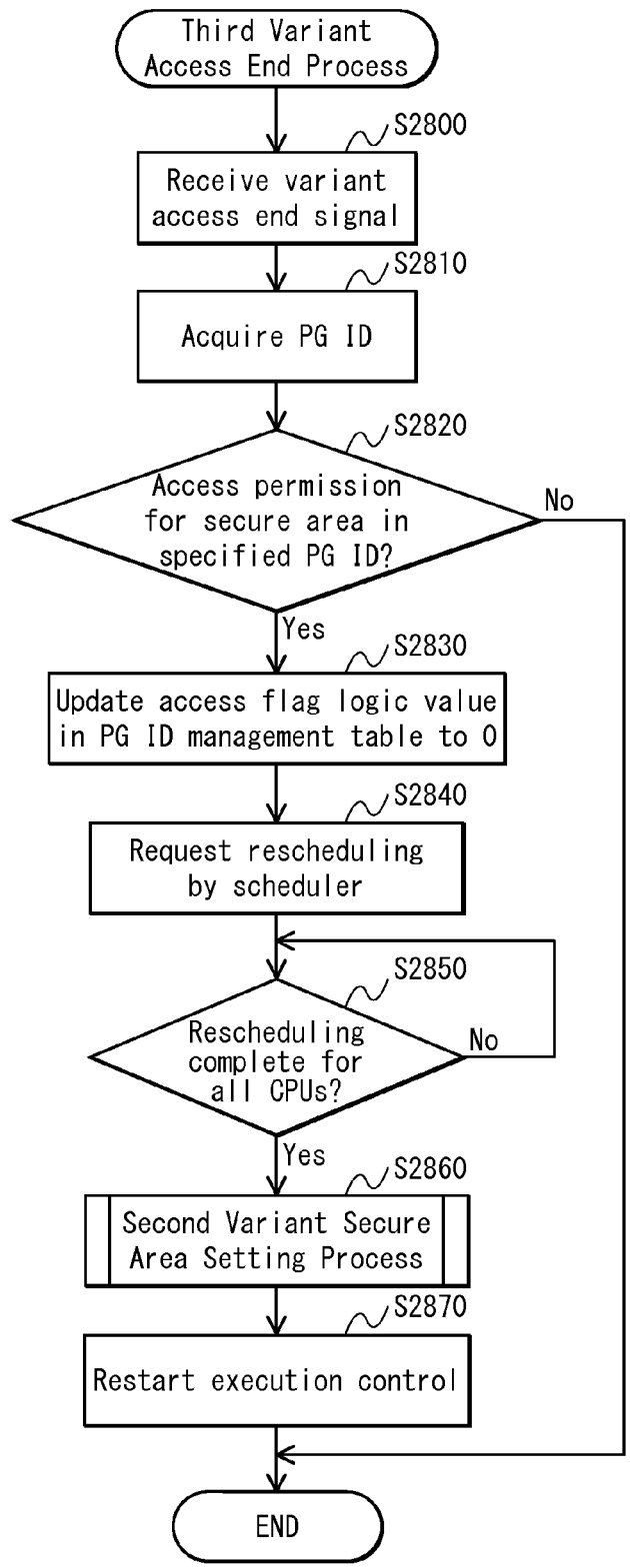
FIG. 28 is a flowchart of a third variant access end process.

FIG. 28 is a flowchart of the third variant access end process.

The third variant access start process begins with the secure area end instructor (secure area end instructor 2242, secure area end instructor 2252, and so on) detecting the end of an access to the secure area 141 by a process in the module that includes the secure area end instructor, and transmitting a variant access end signal to the access flag updater 2261.

Once the third variant access end process has begun, the access flag updater 2261 receives the variant access end signal (step S2800).

Upon receiving the variant access end signal, the access flag updater 2261 acquires the PG ID in the received variant access end signal (step S2810). The access flag updater 2261 then investigates whether or not an identifier identical to the acquired PG ID is in the PG ID 2310 field of the variant secure area management table 2300 stored in the secure area management table storage 2263, and thus investigates whether or not the process group identified by the acquired PG ID has an access permission to the consecutive memory area in the secure area 141 (step S2820).

When the access permission is found in step S2820 (Yes in step S2820), i.e., when the acquired PG ID is in the PG ID 2310 field of the variant secure area management table 2300 stored in the secure area management table storage 2263, the access flag updater 2261 updates the access flag 2440 associated with the PG ID 2410 identical to the acquired PG ID in the PG ID management table 2400 stored in the PG ID management table storage 2262 to have a logic value of zero (step S2830). Then, the access flag updater 2261 makes a rescheduling request to the scheduler 2265 (step S2840).

Upon receiving the rescheduling request, the scheduler 2265 performs the aforementioned second variant rescheduling process, and thus performs execution scheduling such that, for all CPUs, the execution time ratio a process belonging to each process group executed by each CPU corresponds to the priority 2420 ratio for each process group.

The execution controller 2266 temporarily stops the execution of the process for every CPU while the scheduler 2265 is performing the scheduling.

The access control operator 2264 stands by until the scheduler 2265 completes scheduling for all CPUs (repeated No in step S2850). Afterward (Yes in step S2850), the previously-described second variant secure area setting process is performed, such that the register of the control register group 131 to which the values of the start address 2320, the end address 2330, and the access permission 2340 corresponding to the PG ID 410 field with the identifier identical to the PG ID 510 corresponding to the updated access flag 530 are written is overwritten with a logic value of zero, which is the initial value (step S2860).

When step S2860 is complete, the access control operator 2264 notifies the execution controller 2266 that the register writing is complete. The execution controller 2266 then resumes execution control of the process for all CPUs (step S2870).

When the access permission is not found in step S2820 (No in step S2820), i.e., when an identifier identical to the acquired PG ID is not in the PG ID 2310 field of the variant secure area management table 2300 stored in the secure area management table storage 2263, or when step S2870 is complete, the OS 2260 completes the third variant access end process.

(Discussion)

Figure 29:
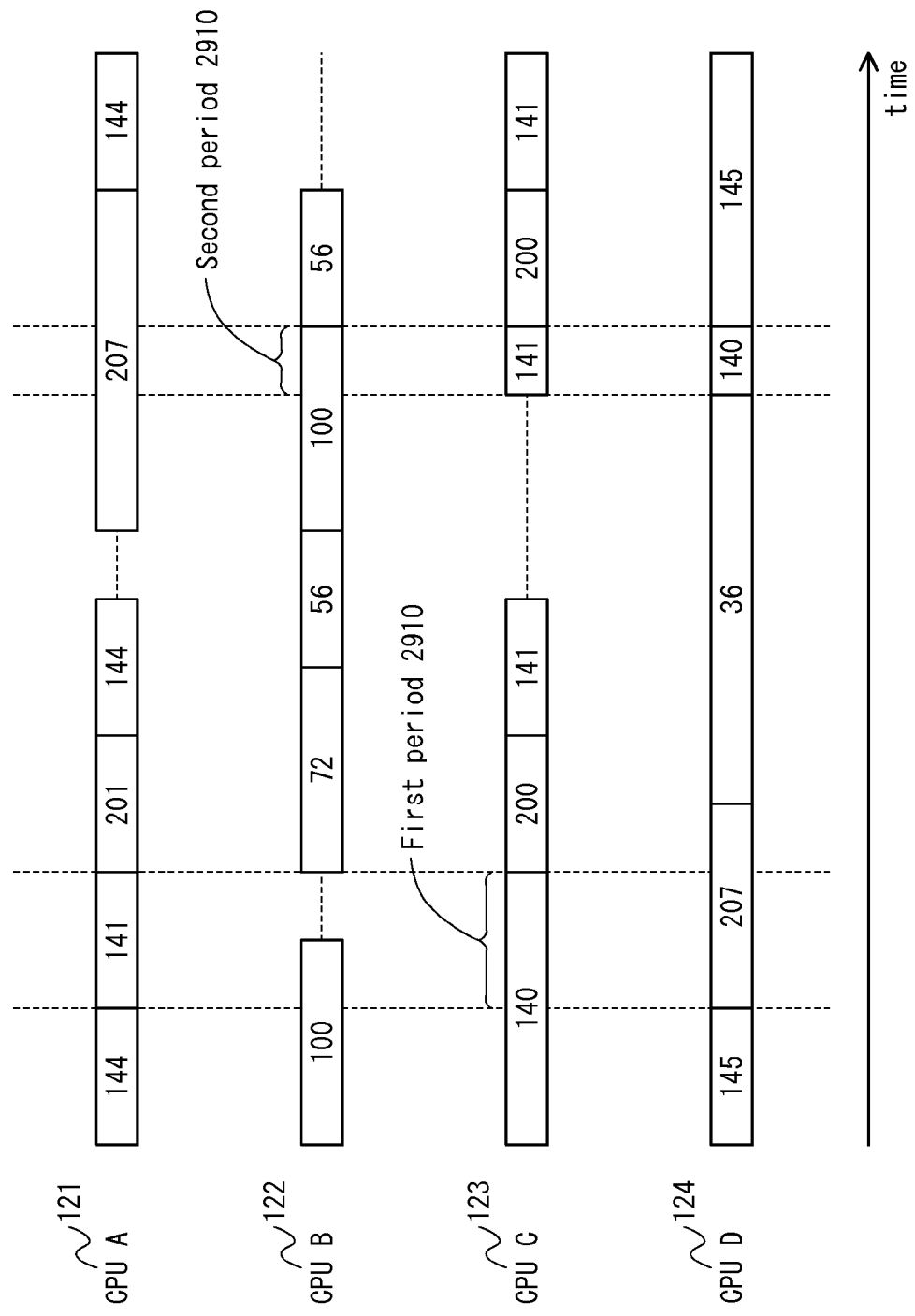
FIG. 29 is a CPU timing chart.

FIG. 29 is an example of a timing chart for the CPUs of the above-described second variant computer system.

As shown, each rectangle inscribed with a number indicates the PID of a process executed by the corresponding CPU, and the dashed lines indicate that the corresponding CPU is idle.

A first period 2910 indicates a secure process having a PID of 140 executed by CPU C 123 performing access to the secure area 141, and a second period 2920 similarly indicates a secure process having a PID of 100 executed by CPU B 122 performing access to the secure area 141.

As shown, the second variant computer system has no process other than process from the secure process group (e.g., the secure process group having a PG ID of one) being executed by any of the CPUs during a secure area access period (e.g., the first period 2910 and the second period 2920) in which an access to the secure area 141 is performed by a secure process executed by any of the CPUs. Accordingly, no non-secure access process is executed during the secure area access period.

Also, as shown, any secure process belonging to a secure process group and any non-secure process belonging to a non-secure process group is executable during a period that is not the secure area access period.

(Supplement)

Although the computer system pertaining to the present disclosure has been described above in Embodiments 1 through 4 as examples of four computer systems, no limitation is intended. The following variations are also applicable to the computer system described in any of the above-described Embodiments.

(1) In Embodiment 1, the processors using the memory 140 are described as being four in number. However, the processors need not necessarily be four in number, provided that the resulting configuration is able to execute two or more programs in parallel. For example, a configuration with two processors is possible.

(2) In Embodiment 1, a configuration is described in which the access controller 130 is between the memory 140 and the bus 150. However, no limitation is intended. The access controller 130 need not necessarily be between the memory 140 and the bus 150 provided that the access to the memory 140 by the CPUs A 121 through D 124 is controlled by the access controller 130. For example, the bus 150 may have the same functions as the access controller 130.

(3) In Embodiment 1, the access controller 130 is described as having a control register group 131 and controlling access to the memory according to a register value set in the control register group 131. However, no limitation is intended. The access controller 130 need not necessarily include the control register group 131, provided that the same functions are realised thereby. For example, the access controller 130 may have a controller embedded within, and the embedded controller may control the access to the memory.

(4) In Embodiment 1, the CPUs A 121 through D 124 have operating modes, namely a user mode, a first privilege mode, and a second privilege mode, executing the OS in the first privilege mode and executing the hypervisor in the second privilege mode. In contrast, and as an alternate arrangement, the CPUs A 121 through D 124 may have a user mode and a privilege mode, executing the OS and the hypervisor in the privilege mode.

(5) In Embodiment 3, the computer system 1800 is described as including a timer 1705 controlled by the CPUs A 121 through D 124. In contrast, and as an alternate arrangement, each CPU may include an independently-controller timer.

(6) In Embodiment 1, an example is described in which the MPU 120, the access controller 130, the memory 140, the bus 150, the first interface 160, the second interface 170, and the third interface 180 are all integrated into a single integrated circuit 110. However, these circuits need not necessarily be integrated into a single integrated circuit, provided that the same functions as the integrated circuit 110 are realised. For example, each circuit may be integrated into a separate integrated circuit.

(7) The following describes further aspects of the computer system pertaining to the Embodiments of the disclosure, along with effects thereof.

In one aspect of the computer system pertaining to the Embodiments, a computer system includes a memory having a secure area, and a first processor and a second processor using the memory, the computer system comprising, as functional components realized by at least one of the first processor and the second processor executing a program stored in the memory: an execution controller managing execution control of a plurality of program units executed by the first processor and the second processor; and a start notification receiver receiving an access start notification from one or more access-allowed program units being one or more of the program units for which access to the secure area is allowed, the access start notification indicating that an access to the secure area by the first processor is starting, wherein when the access start notification is received by the start notification receiver, the execution controller manages limited execution control such that the second processor is limited to executing one of the access-allowed program units.

According to the computer system of the Embodiments configured as described above, the execution controller performs execution control of a plurality of program units until the start of an access to the secure area by an access-allowed program unit, for which access to the secure area is allowed. Thus, during this period, one of the processors is able to execute a program from another program unit, despite the processor losing an executed program from among one of the program units. Accordingly, the computer system increases the probability of improvements to processor efficiency over a conventional computer system performing scheduling for each processor via gang scheduling. This is achieved in a computer system in which a program unit that includes a non-secure program is not subject to execution while an access to the secure area is being performed by the program unit made up of secure programs, at least for the period lasting until the start of the access to the secure area by the program unit made up of secure programs.

Figure 31:
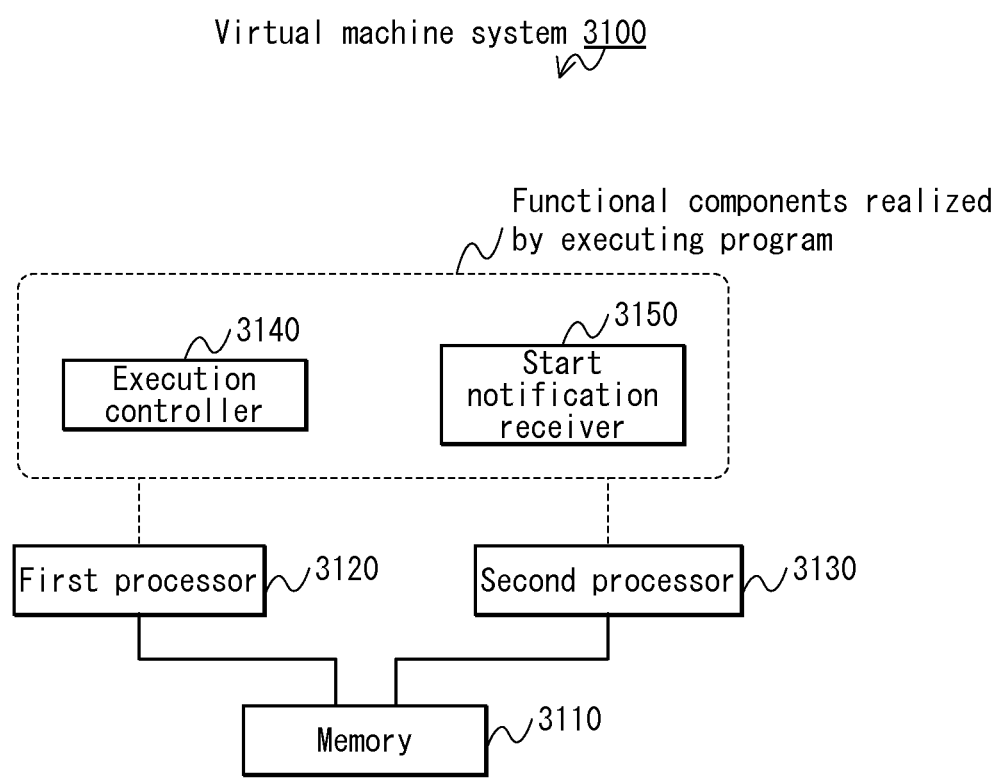
FIG. 31 is a block diagram indicating the configuration of a computer system 3100 pertaining to a variation.

FIG. 31 is an overall schematic of a computer system 3100 pertaining to the aforementioned variant.

As shown, the computer system 3100 includes a memory 3110, a first processor 3120, and a second processor 3130.

The memory 3110 includes a secure area. For example, this is realised as the memory 140 of Embodiment 1.

The first processor 3120 uses the memory 3110. For example, this is realised as CPU A 121 of Embodiment 1.

The second processor 3130 uses the memory 3110. For example, this is realised as CPU B 122 of Embodiment 1.

An execution controller 3140 is a functional component realised by at least one of the first processor 3120 and the second processor 3130 executing a program stored in the memory 3110, and performs execution control of a plurality of program units executed by the first processor 3120 and the second processor 3130. For example, in Embodiment 1, this is realised as the functional blocks of the OS ID management table storage 362, the secure area management table storage 363, the scheduler 365, and the execution controller 366.

A start notification receiver 3150 is a functional component realised by at least one of the first processor 3120 and the second processor 3130 executing a program stored in the memory 3110, and receives an access start notification indicating the start of an access to the secure area by the access-allowed program unit for which access to the secure memory is allowed. For example, this is realised as the access flag updater 361 of Embodiment 1.

Also, when the access start notification is received by the start notification receiver 3150, the execution controller 3140 performs limited execution control such that the second processor 3130 is limited to executing a program unit that is an access-allowed program units.

Also, the computer system may further comprise an end notification receiver receiving an access end notification indicating that the access to the secure area by the first processor is ending, wherein when the access end notification is received by the end notification receiver during the limited execution control, the execution controller manages execution control such that the limitation is removed.

According to this configuration, the execution controller performs execution control on a plurality of program during a period beginning at the end of the access to the secure area by the access-allowed program unit. Thus, during this period, one of the processors is able to execute a program from another program unit, despite the processor losing an executed program from among one of the program units.

The computer system may additionally comprise an execution control value manager managing an execution control value for each of the access-allowed program units, wherein when the access start notification is received by the start notification receiver, the execution control value manager sets the execution control value for each of the access-allowed program units to a predetermined value, and when the access end notification is received by the end notification receiver while the execution control value for each of the access-allowed program units is set to the predetermined value, the execution control value manager sets the execution control value for each of the access-allowed program units to a value other than the predetermined value, and the execution controller performs the limited execution control such that the second processor is limited to executing one of the program units that is one of the access-allowed program units as long as the execution control value for each of the access-allowed program units is set to the predetermined value.

Accordingly, the execution controller is able to perform execution control using an execution control value managed by the execution control value manager.

Further, each of the program units includes an operating system and a program group subject to execution control by the operating system, and the operating system included in each of the access-allowed program units is one among one or more access-allowed operating systems for which access to the secure area is allowed.

Accordingly, a virtual machine made up of an operating system and a program group subject to execution control thereby is made subject to execution control.

In addition, each of the access-allowed operating systems comprises: a start detector detecting the start of the access to the secure area by the first processor, executed by the operating system; a start notifier making the access start notification to the start notification receiver when the start detector detects the start of the access to the secure area; an end detector detecting the end of the access to the secure area by the first processor, executed by the operating system; and an end notifier making the access end notification to the end notification receiver when the end detector detects the end of the access to the secure area.

Accordingly, each access-allowed operating system is able to make the access start notification and the access end notification.

The computer system may additionally comprise an access controller including a setting register, allowing access to the secure area by the first processor and the second processor during a setting period in which the setting register is set with a predetermined register value, and forbidding access to the secure area by the first processor and the second processor during any period other than the setting period; and a register setter setting the setting register with the predetermined register value when the access start notification is received by the start notification receiver, and setting the setting register with a register value other than the predetermined register value when the access end notification is received by the end notification receiver while the setting register is set with the predetermined register value.

Accordingly, the access controller is able to allow the access to the secure area only during the period from access start notification reception to access end notification reception.

Alternatively, the access controller also makes the access start notification to the start notification receiver when an access instruction for access to the secure area by the first processor is issued during any period other than the setting period.

Accordingly, the access controller makes the access start notification.

In an alternate aspect of the present Embodiments, a computer system comprising a memory having a secure area, and a first processor and a second processor using the memory, the computer system comprising, as functional components realized by at least one of the first processor and the second processor executing a program stored in the memory: an execution controller managing execution control of a plurality of program units executed by the first processor and the second processor; and an end notification receiver receiving an access end notification indicating that an access to the secure area by the first processor is ending, wherein when the access end notification is received by the end notification receiver while the execution controller is managing limited execution control such that the second processor is limited to executing one of the program units that is an access-allowed program unit, the execution controller manages the execution control such that the limitation is removed.

According to the computer system of the Embodiments configured as described above, the execution controller performs execution control of a plurality of program units after the end of an access to the secure area by an access-allowed program unit, for which access to the secure area is allowed. Thus, during this period, one of the processors is able to execute a program from another program unit, despite the processor losing an executed program from among one of the program units. Accordingly, the computer system increases the probability of improvements to processor efficiency over a conventional computer system performing scheduling for each processor via gang scheduling. This is achieved in a computer system in which a program unit that includes a non-secure program is not subject to execution while an access to the secure area is being performed by the program unit made up of secure programs, at least for the period after the end of the access to the secure area by the program unit made up of secure programs.

INDUSTRIAL APPLICABILITY

The present disclosure is widely applicable to a computer system having a plurality of processors.

REFERENCE SIGNS LIST

100 Computer system
110 Integrated circuit
121 CPU A
122 CPU B
123 CPU C
124 CPU D
125 Interrupt controller
130 Access controller
131 Control register group
130 Memory
141 Secure area
340 OS a
341 Secure area start instructor 342 Secure area end instructor
350 OS b
351 Secure area start instructor
352 Secure area end instructor
360 Hypervisor
361 Access flag updater
362 OS ID management table storage
363 Secure area management table storage
364 Access control operator
365 Scheduler
366 Execution controller
367 Inter-CPU communication controller

The invention claimed is:

1. A computer system including a memory having a secure area, and a first processor and a second processor using the memory, the computer system comprising, as functional components realized by at least one of the first processor and the second processor executing a program stored in the memory:
- a execution controller managing execution control of a plurality of program units executed by the first processor and the second processor;
- a start notification receiver receiving an access start notification from one or more access-allowed program units being one or more of the program units for which access to the secure area is allowed, the access start notification indicating that an access to the secure area by the first processor is starting;
- an end notification receiver receiving an access end notification indicating that the access to the secure area by the first processor is ending; and
- an execution control value manager managing an execution control value for each of the access-allowed program units, wherein
- when the access start notification is received by the start notification receiver, the execution controller manages limited execution control such that the second processor is limited to executing one of the access-allowed program units,
- when the access end notification is received by the end notification receiver during the limited execution control, the execution controller manages execution control such that the limitation is removed,
- when the access start notification is received by the start notification receiver, the execution control value manager sets the execution control value for each of the access-allowed program units to a predetermined value, and when the access end notification is received by the end notification receiver while the execution control value for each of the access-allowed program units is set to the predetermined value, the execution control value manager sets the execution control value for each of the access-allowed program units to a value other than the predetermined value, and
- the execution controller manages the limited execution control such that the second processor is limited to executing one of the program units that is one of the access-allowed program units as long as the execution control value for each of the access-allowed program units is set to the predetermined value.

2. The computer system of claim 1, wherein
each of the program units includes an operating system and a program group subject to execution control by the operating system, and
the operating system included in each of the access-allowed program units is one among one or more access-allowed operating systems for which access to the secure area is allowed.

3. The computer system of claim 2, wherein
each of the access-allowed operating systems comprises:
- a start detector detecting the start of the access to the secure area by the first processor, executed by the operating system;
- a start notifier making the access start notification to the start notification receiver when the start detector detects the start of the access to the secure area;
- an end detector detecting the end of the access to the secure area by the first processor, executed by the operating system; and
- an end notifier making the access end notification to the end notification receiver when the end detector detects the end of the access to the secure area.

4. The computer system of claim 1, further comprising:
- an access controller including a setting register, allowing access to the secure area by the first processor and the second processor during a setting period in which the setting register is set with a predetermined register value, and forbidding access to the secure area by the first processor and the second processor during any period other than the setting period; and
- a register setter setting the setting register with the predetermined register value when the access start notification is received by the start notification receiver, and setting the setting register with a register value other than the predetermined register value when the access end notification is received by the end notification receiver while the setting register is set with the predetermined register value.

5. The computer system of claim 4, wherein
the access controller also makes the access start notification to the start notification receiver when an access instruction for access to the secure area by the first processor is issued during any period other than the setting period.

6. A computer system control method controlling a computer system including a memory having a secure area, and a first processor and a second processor using the memory, the computer system control method comprising:
- a execution control step of managing execution control of a plurality of program units executed by the first processor and the second processor;
- a start notification reception step of receiving an access start notification from one or more access-allowed program units being one or more of the program units for which access to the secure area is allowed, the access start notification indicating that an access to the secure area by the first processor is starting;
- an end notification reception step of receiving an access end notification indicating that the access to the secure area by the first processor is ending; and
- an execution control value managing step of managing an execution control value for each of the access-allowed program units, wherein
- when the access start notification is received in the start notification reception step, the execution control step involves managing limited execution control such that the second processor is limited to executing one of the access-allowed program units,
- when the access end notification is received in the end notification reception step during the limited execution control, the execution control step involves managing execution control such that the limitation is removed, when the access start notification is received in the start notification reception step, the execution control value managing step involves setting the execution control value for each of the access-allowed program units to a predetermined value, and when the access end notification is received in the end notification reception step while the execution control value for each of the access-allowed program units is set to the predetermined value, the execution control value managing step involves setting the execution control value for each of the access-allowed program units to a value other than the predetermined value, and the execution control step involves managing the limited execution control such that the second processor is limited to executing one of the program units that is one of the access-allowed program units as long as the execution control value for each of the access-allowed program units is set to the predetermined value.

7. A non-transitory computer readable storage medium having stored therein a computer system control program for causing a computer system including a memory having a secure area, and a first processor and a second processor using the memory to execute a computer system control process, the computer system control program comprising:

an execution control step of managing execution control of a plurality of program units executed by the first processor and the second processor;

a start notification reception step of receiving an access start notification from one or more access-allowed program units being one or more of the program units for which access to the secure area is allowed, the access start notification indicating that an access to the secure area by the first processor is starting;

an end notification reception step of receiving an access end notification indicating that the access to the secure area by the first processor is ending; and an execution control value managing step of managing an execution control value for each of the access-allowed program units, wherein when the access start notification is received in the start notification reception step, the execution control step involves managing limited execution control such that the second processor is limited to executing one of the access-allowed program units, when the access end notification is received in the end notification reception step during the limited execution control, the execution control step involves managing execution control such that the limitation is removed, when the access start notification is received in the start notification reception step, the execution control value managing step involves setting the execution control value for each of the access-allowed program units to a predetermined value, and when the access end notification is received in the end notification reception step while the execution control value for each of the access-allowed program units is set to the predetermined value, the execution control value managing step involves setting the execution control value for each of the access-allowed program units to a value other than the predetermined value, and the execution control step involves managing the limited execution control such that the second processor is limited to executing one of the program units that is one of the access-allowed program units as long as the execution control value for each of the access-allowed program units is set to the predetermined value.

8. An integrated circuit including a memory having a secure area, and a first processor and a second processor using the memory, the integrated circuit comprising, as functional components realized by at least one of the first processor and the second processor executing a program stored in the memory:

an execution controller managing execution control of a plurality of program units executed by the first processor and the second processor;

a start notification receiver receiving an access start notification from one or more access-allowed program units being one or more of the program units for which access to the secure area is allowed, the access start notification indicating that an access to the secure area by the first processor is starting;

an end notification receiver receiving an access end notification indicating that the access to the secure area by the first processor is ending; and an execution control value manager managing an execution control value for each of the access-allowed program units, wherein when the access start notification is received by the start notification receiver, the execution controller manages limited execution control such that the second processor is limited to executing one of the access-allowed program units, when the access end notification is received by the end notification receiver during the limited execution control, the execution controller manages execution control such that the limitation is removed, when the access start notification is received by the start notification receiver, the execution control value manager sets the execution control value for each of the access-allowed program units to a predetermined value, and when the access end notification is received by the end notification receiver while the execution control value for each of the access-allowed program units is set to the predetermined value, the execution control value manager sets the execution control value for each of the access-allowed program units to a value other than the predetermined value, and the execution controller manages the limited execution control such that the second processor is limited to executing one of the program units that is one of the access-allowed program units as long as the execution control value for each of the access-allowed program units is set to the predetermined value.

* * * * *